(12) United States Patent
DesJardien et al.

(10) Patent No.: US 9,873,230 B1
(45) Date of Patent: Jan. 23, 2018

(54) MOBILE SYSTEM FOR AUTOMATED LAYUP AND COMPACTION OF COMPOSITE LAMINATES

(71) Applicant: The Boeing Company, Chicago, IL (US)

(72) Inventors: Matthew R. DesJardien, Kenmore, WA (US); James N. Buttrick, Seattle, WA (US); Terrence J. Rowe, Seattle, WA (US); Daniel Mark McDonagh, Seattle, WA (US); Silas Lawton Studley, Seattle, WA (US); Tracy E. Zimmerman, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 790 days.

(21) Appl. No.: 14/463,022

(22) Filed: Aug. 19, 2014

(51) Int. Cl.
| | | |
|---|---|---|
| *B29C 70/38* | (2006.01) | |
| *B29C 70/54* | (2006.01) | |
| *B29C 31/08* | (2006.01) | |
| B29K 105/06 | (2006.01) | |
| B29K 105/00 | (2006.01) | |
| B29L 31/30 | (2006.01) | |

(52) U.S. Cl.
CPC ............ *B29C 70/388* (2013.01); *B29C 70/54* (2013.01); *B29K 2105/06* (2013.01); *B29K 2105/253* (2013.01); *B29L 2031/3076* (2013.01); *Y10S 901/44* (2013.01)

(58) Field of Classification Search
CPC ....... B29C 70/388; B29C 70/54; B29C 31/08; B29C 31/085
See application file for complete search history.

(56) References Cited

U.S. PATENT DOCUMENTS

| | | | | |
|---|---|---|---|---|
| 4,208,238 A | * | 6/1980 | August | B23K 26/0846 156/510 |
| 4,846,517 A | | 7/1989 | Boke et al. | |
| 4,875,962 A | | 10/1989 | Breakspear | |
| 5,183,670 A | | 2/1993 | Trudeau | |
| 5,209,804 A | | 5/1993 | Trudeau | |
| 5,290,386 A | | 3/1994 | Trudeau | |
| 5,388,978 A | * | 2/1995 | Bellettato | B29C 31/085 264/339 |
| 5,876,550 A | | 3/1999 | Feygin et al. | |
| 5,879,489 A | * | 3/1999 | Burns | B22F 3/005 156/234 |
| 6,131,973 A | | 10/2000 | Trudeau et al. | |
| 7,766,063 B2 | | 8/2010 | Lauder et al. | |
| 8,003,034 B2 | * | 8/2011 | Oldani | B29C 70/382 156/189 |
| 8,066,929 B2 | | 11/2011 | Eberth et al. | |

(Continued)

FOREIGN PATENT DOCUMENTS

| | | | | |
|---|---|---|---|---|
| DE | 10216221 C1 | 10/2003 | | |
| DE | 102011056029 A1 | * 6/2013 | ......... | B25J 15/0616 |
| EP | 3023233 A1 | * 5/2016 | ............ | B29C 70/38 |

*Primary Examiner* — Robert B Davis
(74) *Attorney, Agent, or Firm* — Yee & Associates, P.C.

(57) ABSTRACT

A mobile vehicle is used to place, compact and inspect composite plies at selected locations on a tool. The vehicle includes an on-board supply of composite plies, a transfer platen for transferring plies to the tool, a compactor for compacting plies on the tool, and an inspection device for inspecting plies on the tool, each operated and manipulated by an on-board manipulator such as a robot.

21 Claims, 38 Drawing Sheets

(56) References Cited

U.S. PATENT DOCUMENTS

| | | |
|---|---|---|
| 8,333,864 B2 | 12/2012 | Brennan et al. |
| 8,551,380 B2 | 10/2013 | Hawkins et al. |
| 8,556,618 B2 * | 10/2013 | Bergmann ............ B29C 51/085 264/313 |
| 8,574,388 B2 * | 11/2013 | Colombo .............. B29C 70/388 156/243 |
| 8,601,694 B2 | 12/2013 | Brennan et al. |
| 8,936,695 B2 * | 1/2015 | Rotter ................... B29C 70/382 100/269.02 |
| 9,050,758 B2 * | 6/2015 | De Mattia ............... B29C 70/34 |
| 2008/0178996 A1 * | 7/2008 | Tada ....................... B29C 63/16 156/285 |
| 2012/0330453 A1 | 12/2012 | Samak Sangari et al. |

* cited by examiner

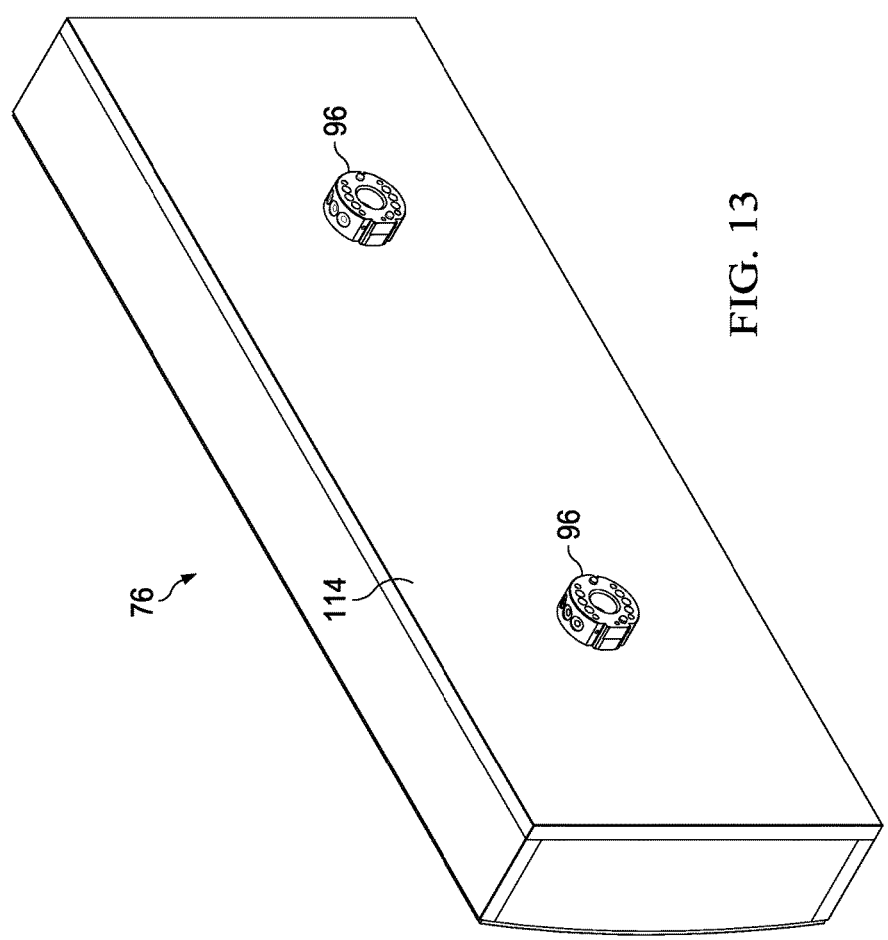

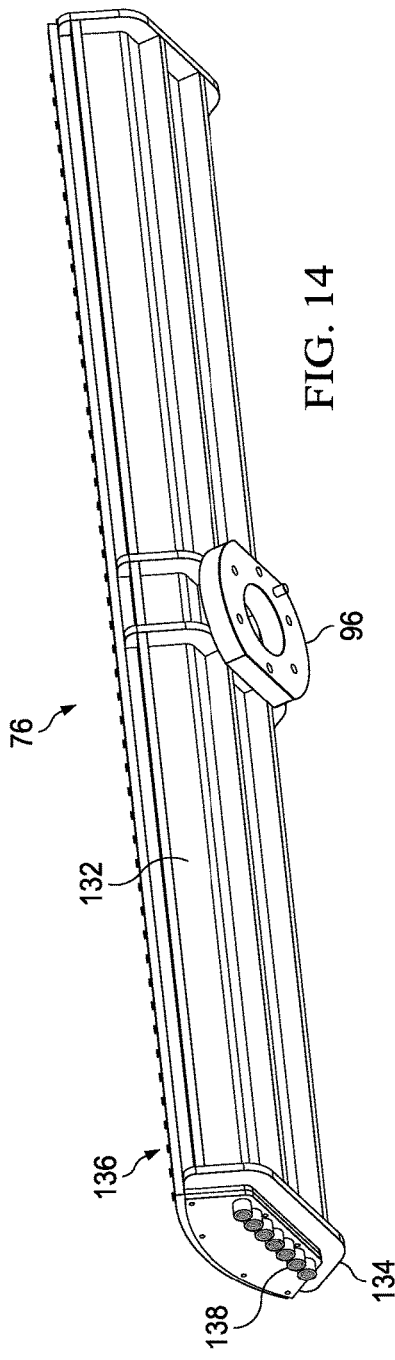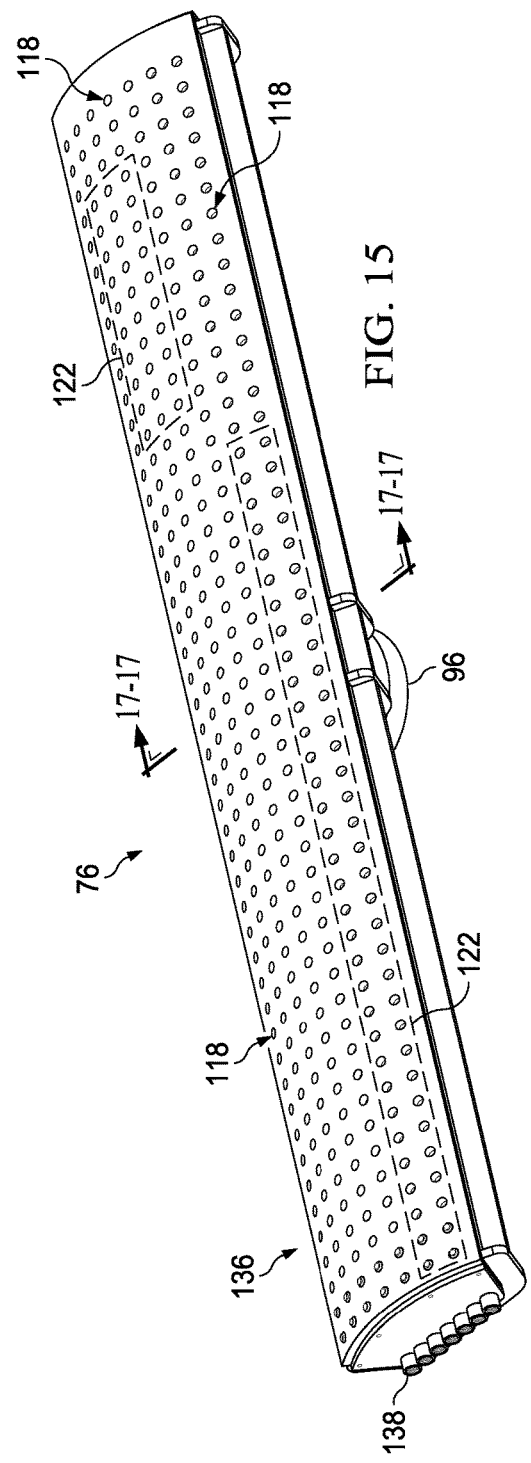

MOBILE SYSTEM FOR AUTOMATED LAYUP AND COMPACTION OF COMPOSITE LAMINATES

BACKGROUND INFORMATION

1. Field

The present disclosure generally relates to fabrication of composite laminate structures, and deals more particularly with a mobile system for automated layup and compaction of composite plies on a tool.

2. Background

There are currently several techniques for laying up and compacting composite prepreg plies on a tool. Hand layup of plies is possible, but is time-consuming, labor intensive, and may be inaccurate and/or inconsistent. Composite plies may be laid up using automated fiber placement machines, but these machines are large, expensive and require intricate programming and significant validation.

Another layup method relies on a ply carrier/transfer medium. In this method, a prepreg ply is compacted onto a flexible membrane which holds and locates the ply. The membrane is used to transfer the ply to a tool by pressing through it, either by hand or using an automated machine. These ply carriers/membranes are a consumable item that add to production costs, can possibly introduce unacceptable foreign object debris, and the transfer from the carrier to the tool requires supervision and manual intervention.

Pick and place end effectors have been proposed to partially automate the process of ply layup, but these devices have been limited to moving a flat plies onto flat tool surfaces, and lacks the ability to compact the plies over contoured tool surfaces or roll plies around tool corners. Accordingly, there is a need for a method and apparatus that automates the process of laying up and compacting composite laminates, particularly those having long lengths and/or those having complex ply schedules. There is also a need for a method and apparatus of the type mentioned above that minimizes or eliminates the need for human intervention and supervision, while providing consistent and accurate ply placement.

SUMMARY

The disclosed embodiments provide a mobile system for automated layup and compaction of composite plies on a tool. The mobile system employs a mobile vehicle having an on-board supply of kitted plies, as well as end effectors manipulated by a robot to pick up, place and compact plies along the length of a tool. The need for human intervention/supervision and touch labor is reduced or eliminated. Automation of the process of delivering, placing and compacting plies at differing locations of the tool may increase production rate, improve placement accuracy and provide for consistent compaction of laminates.

According to one disclosed embodiment, apparatus is provided for laying up and compacting composite plies on a tool. The apparatus includes a mobile vehicle having a ply supply that includes a plurality of composite plies. The apparatus also includes a platen on the vehicle for picking up and transferring the plies from the ply supply to the tool, and a compactor on the vehicle for compacting the plies on the tool. The apparatus further comprises a guidance and drive system for guiding and driving the vehicle alongside the tool, as well as a tool indexer coupling the vehicle with the tool at preselected, indexed locations along the tool. The tool indexer may also follow a continuous curve to allow precise alignment of the vehicle at any point along the tool. The ply supply includes a case, and a plurality of drawers in the case, each of the drawers capable of holding at least one of the plies. The case may be removably mounted on the vehicle. At least one robot on the vehicle manipulates each of the platen and the compactor. The apparatus may also include at least one inspection device on the vehicle capable of being manipulated by the robot for inspecting at least one feature of plies on the tool. Each of the platen, the compactor and the inspection device includes a releasable coupling and is capable of being releasably coupled with the robot.

According to another disclosed embodiment, apparatus is provided for laying up and compacting composite plies on an elongate tool. The apparatus includes a mobile vehicle movable along a length of the tool, and end effectors on the vehicle for placing and compacting plies on the tool. A manipulator on the vehicle is used to manipulate the end effectors. The end effectors include a platen for picking up and placing plies on the tool, and a compactor for compacting plies on the tool. The end effectors may also include at least one inspection device for inspecting at least one feature of plies on the tool. The apparatus may further include a plurality of movable drawers on the vehicle, each capable of holding at least one of the plies. The platen may include a generally curved ply engaging face, and a vacuum pickup system for holding plies on the face. The ply engaging face is compliant, and the vacuum pickup system includes a plurality of perforations in the ply engaging face through which air may be drawn forming a vacuum that draws a ply against the ply engaging face.

According to still another embodiment, a method is provided of laying up and compacting plies on a tool. A supply of composite plies is loaded onto a mobile vehicle. The vehicle is moved to each of a plurality of locations along the tool, and the plies are robotically transferred from the vehicle to the tool. The plies are also robotically compacted on the tool. The robotic transfer and compaction of the plies may be performed at each of the plurality of locations along the tool. Loading the plies includes placing at least one ply in each of a plurality of drawers on the vehicle. The method may further comprise moving the vehicle between a ply source location and each of a plurality of locations along the tool where the plies are robotically transferred to and compacted on the tool. Robotic transfer of the plies includes coupling a robot with a transfer platen and using the transfer platen to pick up and transfer the plies from the vehicle to the tool, and robotic compaction of the plies includes coupling the robot with a compactor and using the compactor to compact the plies on the tool. In some embodiments, the transfer platen may also be used to compact the plies on the tool. The method further comprises coupling the robot with at least one inspection device, and inspecting at least one feature of a ply on the tool using the inspection device.

According to still another embodiment, a method is provided of placing a composite ply on a tool. A ply is drawn against a generally curved platen face, and the ply is brought into substantially line contact with the tool. The curved platen face is rolled over the tool. The ply is released from the curved platen face as the curved platen face rolls over the tool.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 13 is an illustration of a perspective view of the rear side of the transfer platen of FIGS. 11 and 12.

FIG. 14 is an illustration of a rear perspective view of an alternate embodiment of the transfer platen.

FIG. 15 is an illustration of a perspective view of the front side of the transfer platen shown in FIG. 14.

DETAILED DESCRIPTION

Figure 1:
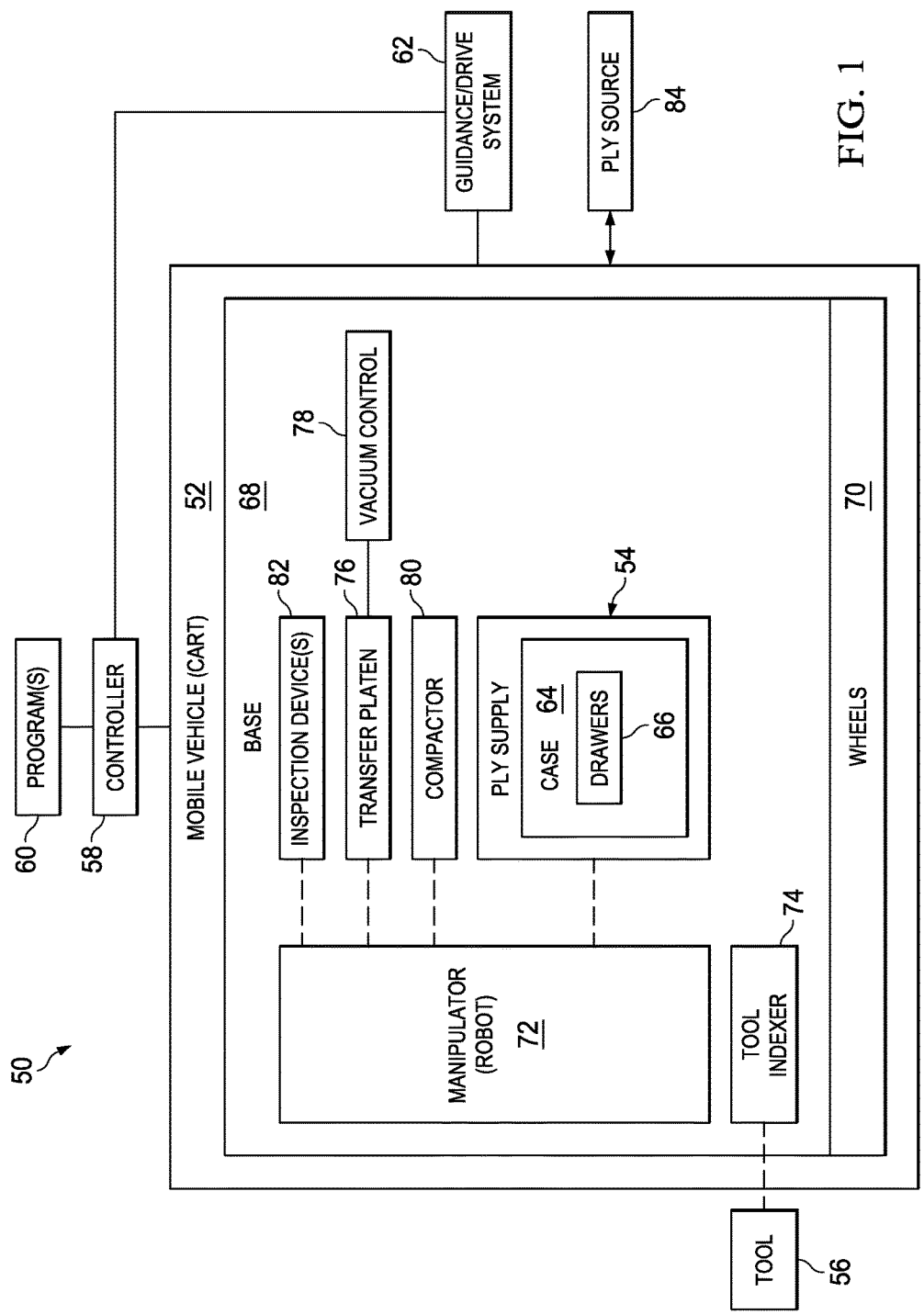
FIG. 1 is an illustration of an overall block diagram of a mobile system for automated layup and compaction of composite plies.
Figure 2:
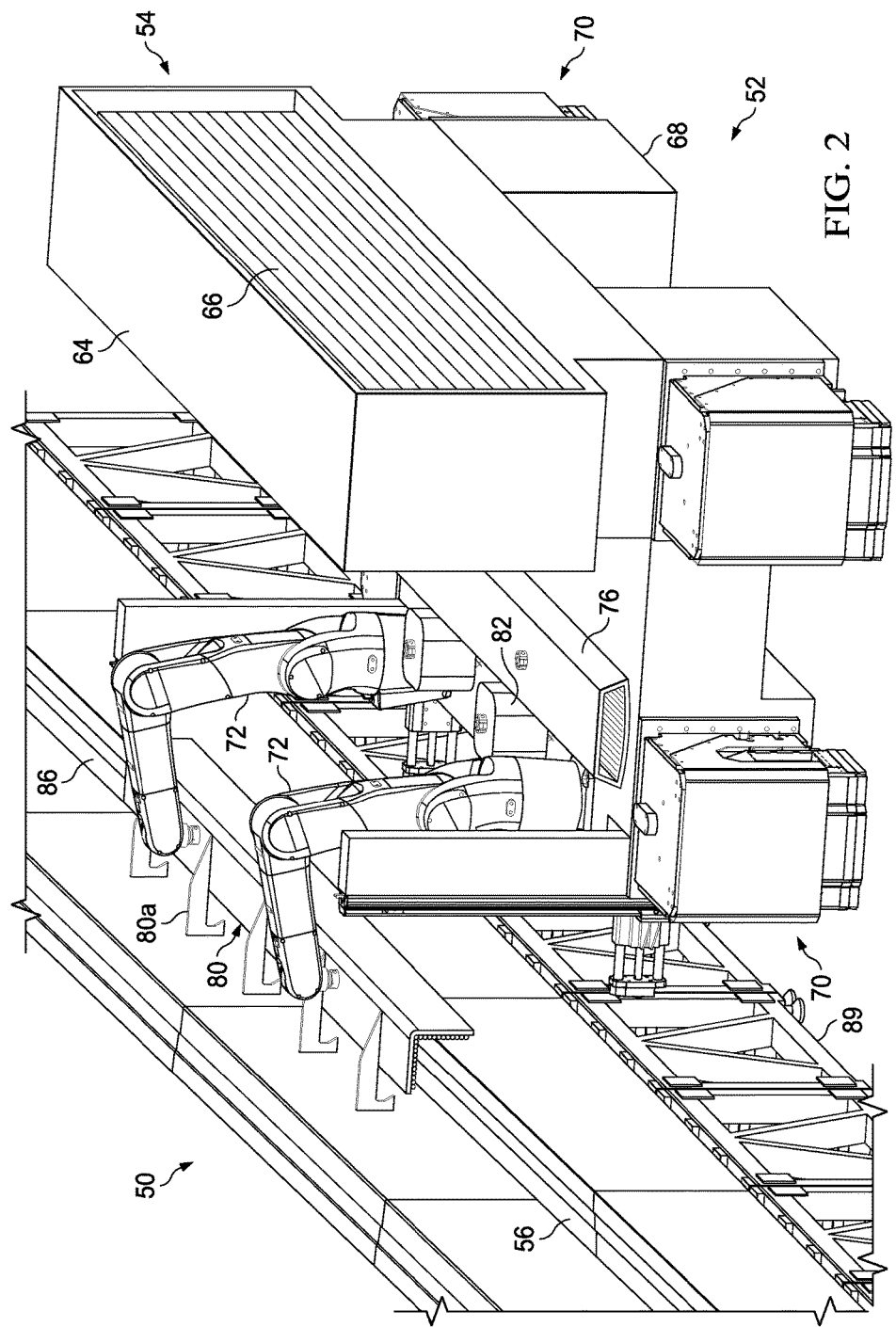
FIG. 2 is an illustration of a perspective view of a mobile vehicle positioned along a tool and showing a ply being compacted.

Referring first to FIGS. 1 and 2, the disclosed embodiments relate to an apparatus 50 for automated layup, compaction and inspection of composite laminate structures, particularly elongate structures such as, for example and without limitation stringers used in the aircraft industry. In the illustrated embodiments discussed below, the illustrated composite laminate structure is a stringer, however a variety of other composite structures are possible, including but not limited to spars, other stiffeners, beams and skins. Composite prepreg plies 86 (FIG. 2) are placed (laid up) and then compacted on an elongate tool 56 which, in the illustrated example, is supported on an elevated base 89.

The apparatus 50 broadly comprises a mobile vehicle 52 such as a cart or other platform that is movable alongside the tool 56 between a source of plies 84 and any of a plurality of preselected locations along the length of the tool 56. The vehicle 52 includes a base that is mounted for movement alongside the tool 56 using any suitable means such as wheels 70. The vehicle further includes multiple onboard devices carried on the base 68 including a ply supply 54, and end effectors comprising a transfer platen 76, a compactor 80, one or more inspection devices 82, along with a manipulator 72 to manipulate the end effectors. A tool indexer 74 may also be mounted on the base 68 for coupling and indexing the vehicle 52 with the tool 56 at desired locations along the length of the tool 56.

The manipulator 72, hereinafter sometimes also referred to as a robot, may comprise an automatically controlled, articulated arm type robot, a gantry type mechanism or other automatically controlled mechanism capable of manipulating the platen 76, the compactor 80 and the inspection device 82. In the illustrated embodiment, the manipulator 72 comprises a pair of robots having articulated arms. The arms are provided with releasable couplings in the form of quick change tool interfaces 75 that releasably couple with flanges 96 provided on the platen 76, compactor 80 and inspection devices 82. A guidance and drive system 62 drives and guides the vehicle 52 along the length of the tool 56. In some embodiments, the vehicle 52 may be autonomous while in other applications the vehicle 52 may be guided by rails, tracks or other devices. A controller 58, which may comprise a computer or a PLC (programmable logic controller) has access to one or more programs 60 and is operative to control systems onboard the vehicle 52 as well as the guidance and drive system 62.

Figure 3:
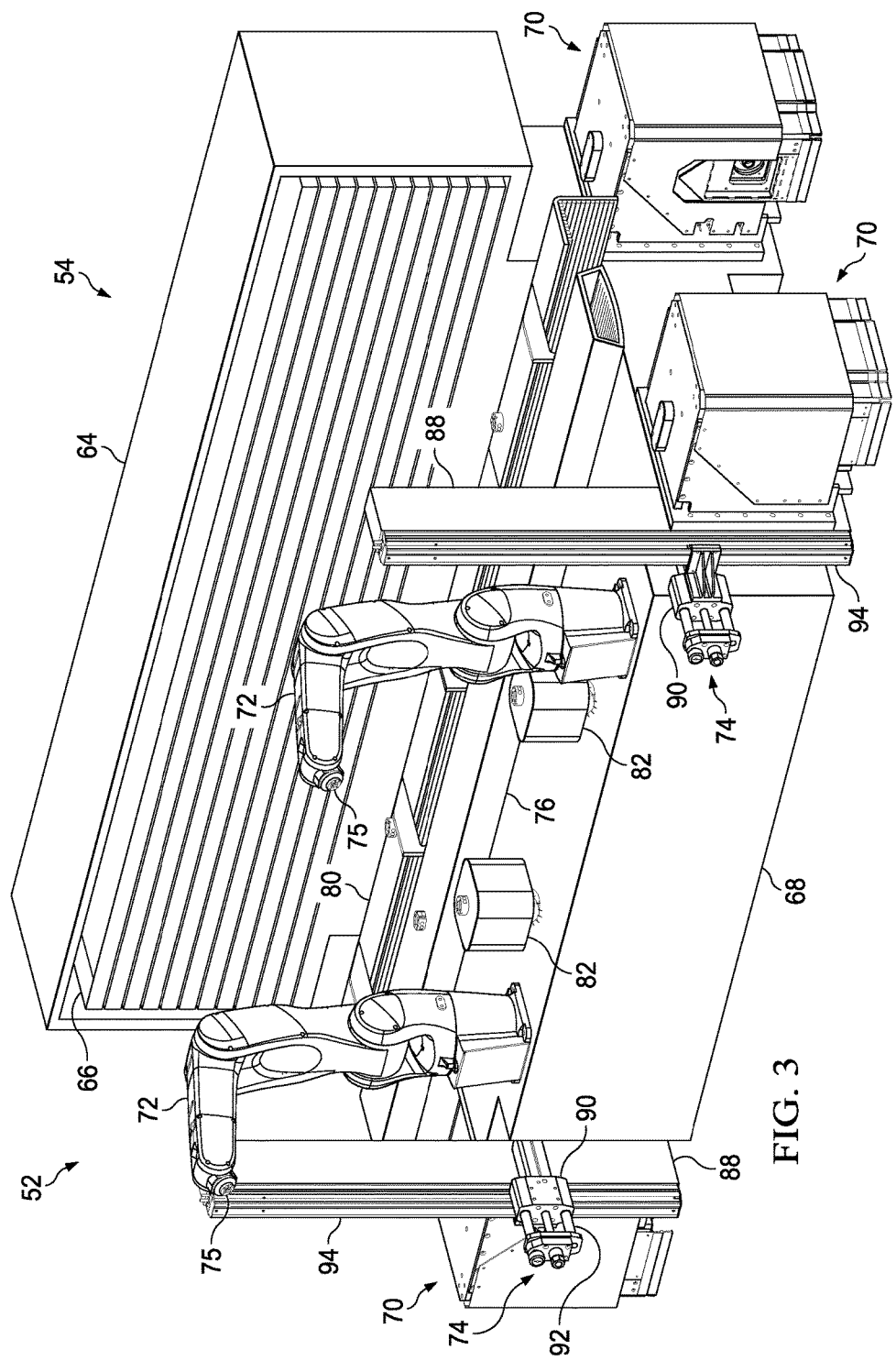
FIG. 3 is an illustration of a perspective view of the mobile vehicle shown in FIGS. 1 and 2, illustrating additional details of the mobile vehicle.
Figure 8:
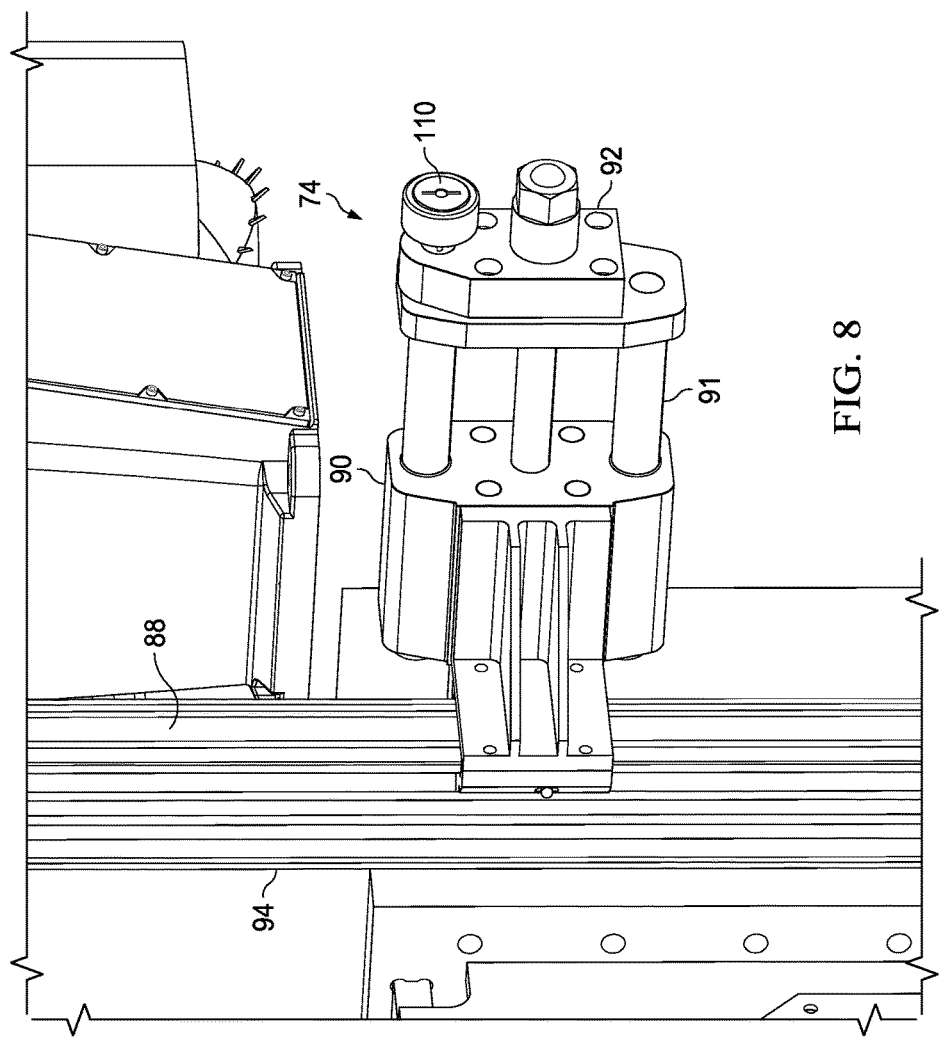
FIGS. 8 and 9 are illustrations of perspective views of left and right indexing mechanisms that index the mobile vehicle to the tool.
Figure 9:
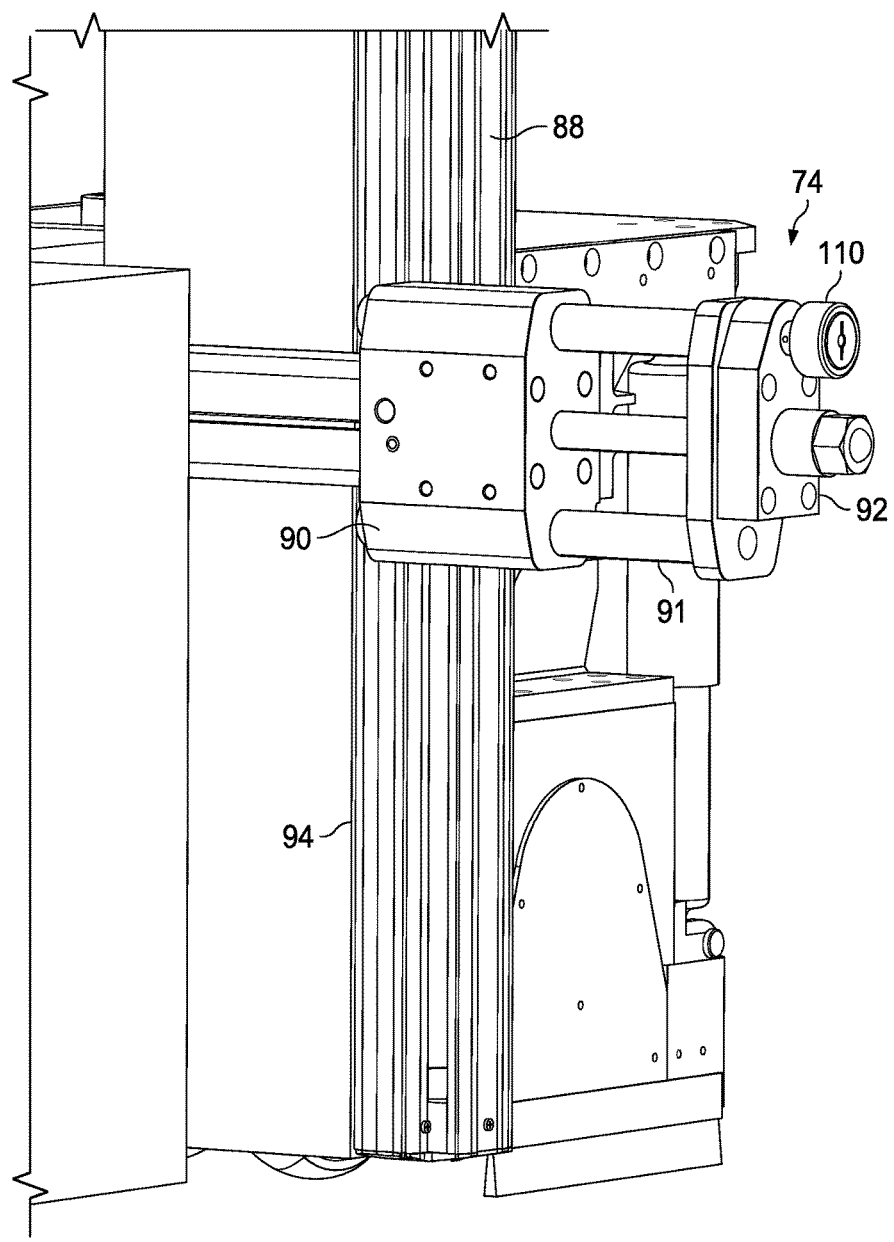
Figure 10:
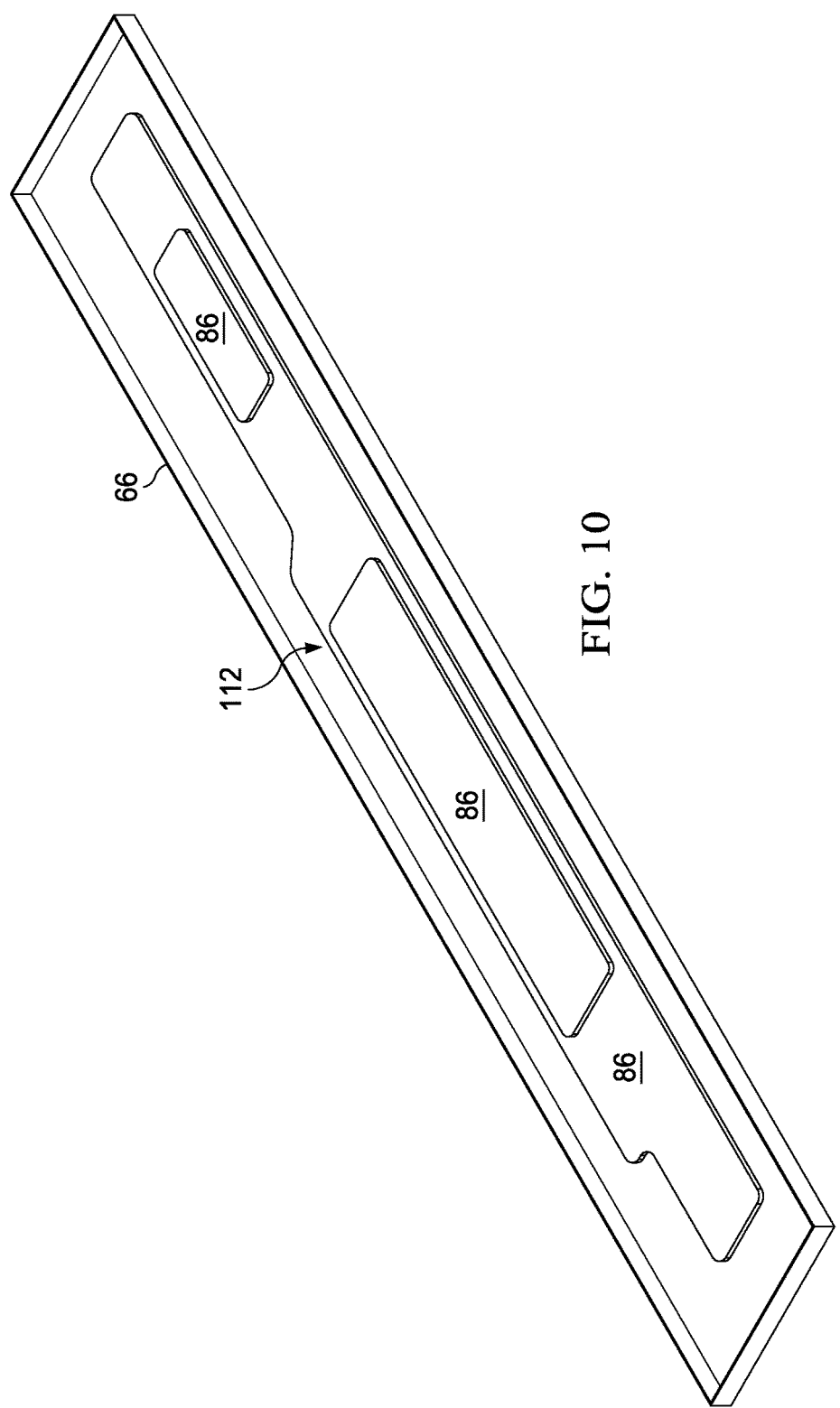
FIG. 10 is an illustration of a perspective view of one of the drawers carried on the mobile vehicle and loaded with a set of kitted plies.

Attention is now directed to FIGS. 2-10 which illustrate additional details of the vehicle 52. The ply supply 54 comprises an open sided case 64 containing a plurality of slidable, tray-like, movable drawers 66 (FIGS. 3 and 10). Each of the drawers 66 is outwardly slidable from either side of the case 64. As shown in FIG. 10, each of the drawers 66 contains one or more flat, precut plies 86 that are to be laid up and compacted at a particular location on the tool 56. Each of the drawers 66 may have a perforated bottom coupled with a vacuum system (not shown) which holds the plies in a desired, pre-indexed position in the drawer 66. In some embodiments, the plies 86 may be preassembled into a ply kit 112 before being placed in the drawer 66 at a remote ply source location. In some embodiments, the case 64 may be permanently mounted on the base 68, while in other embodiments, the case 64 may be removably mounted on the base 68 using any suitable mechanical mechanism such as a set of quick release clamps (not shown).

The platen 76 and the compactor 80 are mounted on the top of the base 68 between the case 64 and the side of the base 68 facing the tool 56. A pair of non-contact inspection devices 82 such as cameras, laser line scanners, blue line scanners or the like are also mounted on top of the base 68 alongside the platen 76 and compactor 80 for inspecting features of plies 86 that have been placed on the tool 56, including the position of the ply 86 and its ID (identification number). A pair of tool indexers 74 are mounted on opposite ends of the base 68. The tool indexers 74 are mounted for vertical sliding movement on upright posts 88 that form part of the base 68. One or more manipulators 72 which may comprise robots or similar devices are mounted on the base 68 and have a reach that allows them to pick up and manipulate the platen 76, a compactor 80 or the inspection devices 82, as will be discussed later in more detail. A noncontact pickup 98 wirelessly connects the vehicle 52 to the controller 58 (FIG. 1). Alternatively, the pickup 98 may be an inductive type pickup that receives power or control signals from wiring embedded in a factory floor (not shown).

Figure 4:
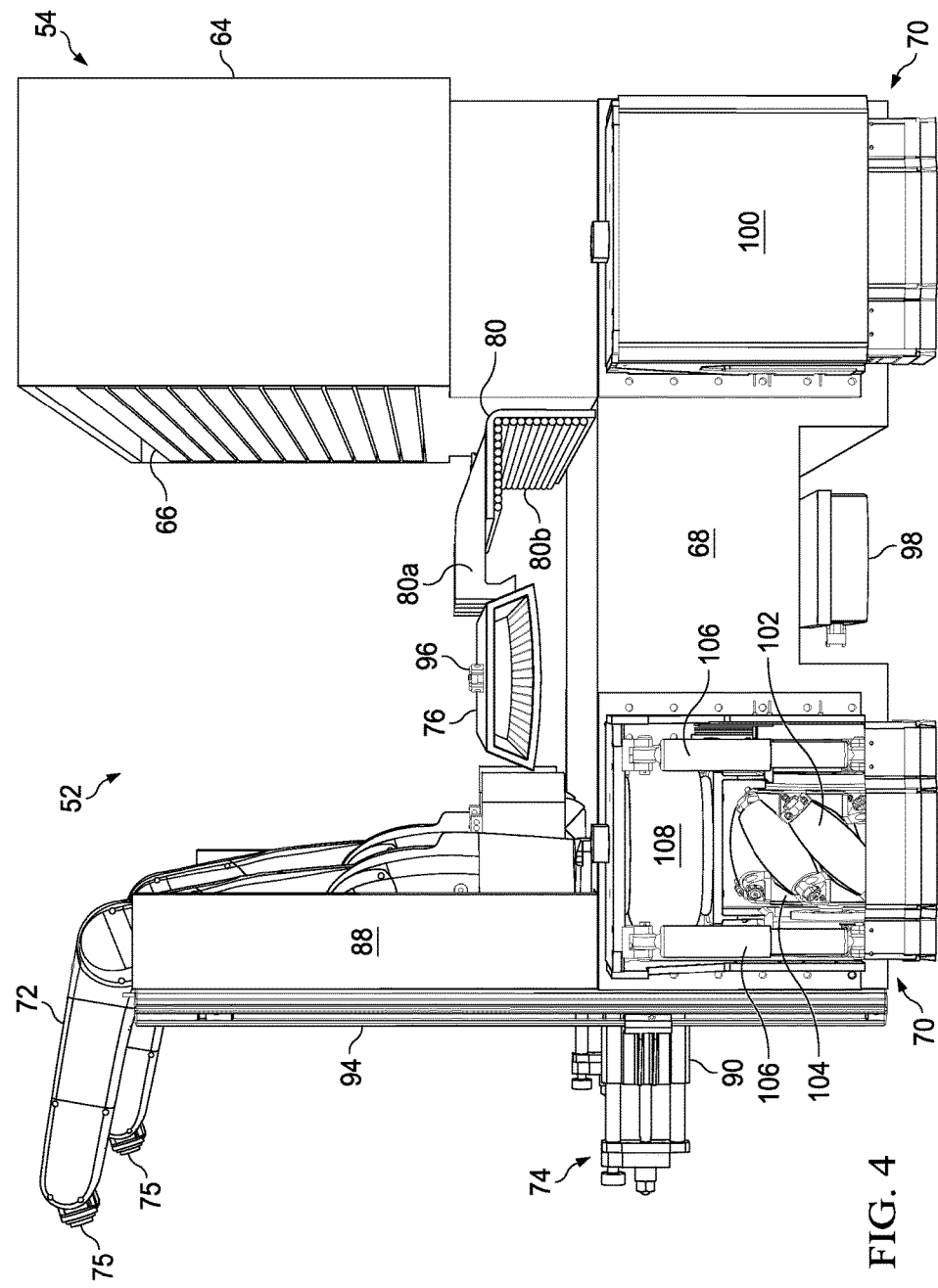
FIG. 4 is an illustration of an end view of the mobile vehicle shown in FIG. 3, a portion of a wheel shroud being broken away to show details of one of the wheel assemblies.
Figure 5:
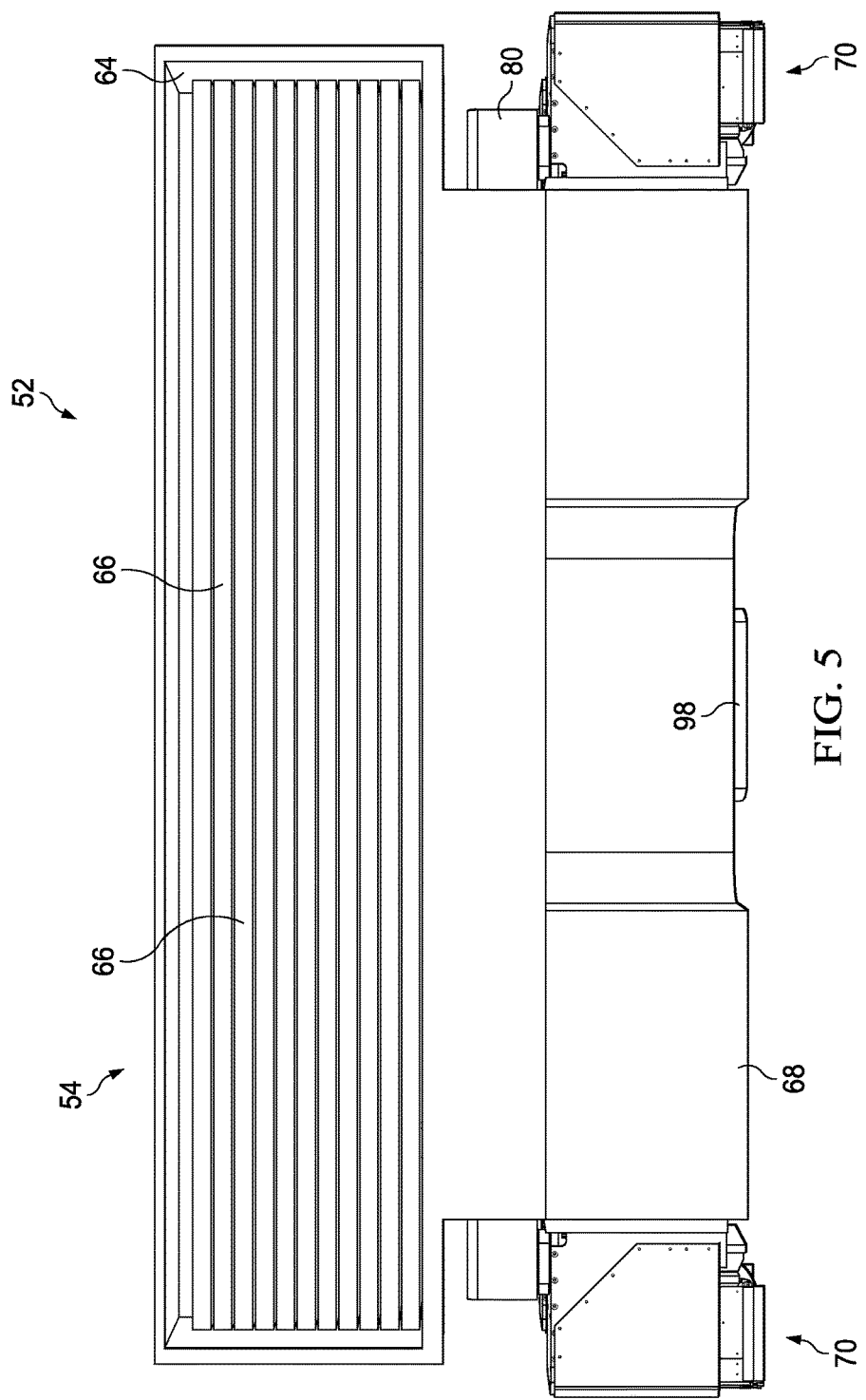
FIG. 5 is an illustration of a rear elevational view of the mobile vehicle of FIG. 3.
Figure 6:
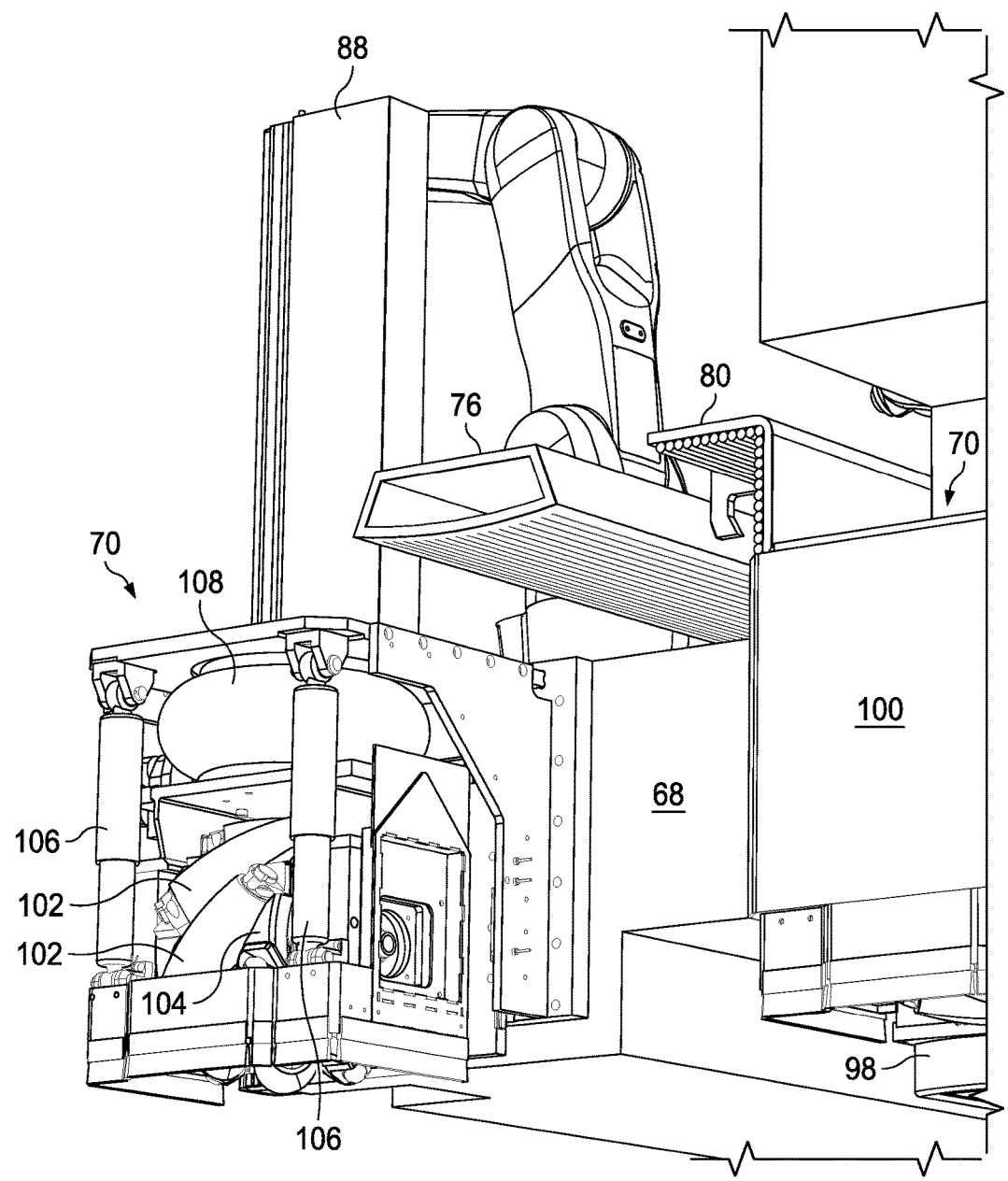
FIG. 6 is an illustration of a perspective view showing additional details of one of the wheel assemblies.

A wheel assembly 70 mounted on each corner of the base 68 allows the vehicle 52 to move over a factory floor (not shown) along a control path alongside the tool 56. Referring now to FIGS. 4 and 6, each of the wheel assemblies 70 includes a Mecannum type wheel comprising a plurality of diagonally oriented rollers 102 circumferentially mounted around a rotatable wheel hub 104 that is driven by an electric wheel motor (not shown). While a Mecannum type wheel is illustrated, other types of omnidirectional-capable wheel sets may be employed. The wheel assemblies 70 also include shock absorbers 106, and bellows air springs 108 for lowering the base 68 onto hard points (not shown). The wheel assemblies 70 are enclosed by surrounding shrouds 100 that are attached to the base 68.

Figure 7:
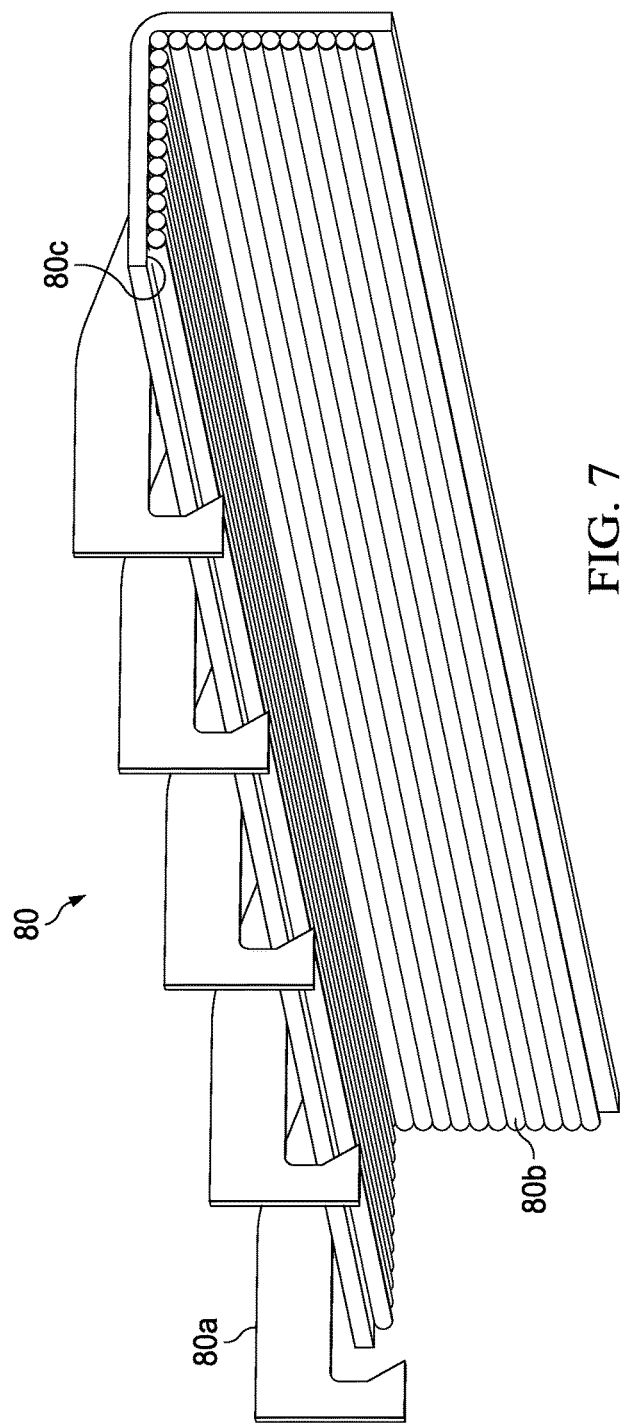
FIG. 7 is an illustration of a perspective view of a compactor carried on-board the mobile vehicle.

FIG. 7 illustrates additional details of one embodiment of the compactor 80 suitable for both forming and compacting a composite laminate structure having a substantially L-shaped cross-section, such as a blade stringer (not shown). The compactor 80 comprises a rigid tool 80*c* having an L-shaped cross-section, inflatable bladder like tubes 80*b* and a plurality of longitudinally spaced, hook-shaped extensions 80*a* that are fixed to the tool 80*c*. Inflatable tubes 80*b* are arranged along the inside of the tool 80*c* and are adapted to engage the plies 86 (FIG. 2). The hook-shaped extensions 80*a* are adapted to hook onto the layup tool 56 in order to gain additional leverage which increases the compaction pressure applied to the plies 86.

Referring now particularly to FIGS. 3, 8 and 9, the tool indexers 74 broadly comprise air cylinders 90 slidably mounted in tracks 94 for vertical displacement along the posts 88. Roller mounts 92 are attached to the outer ends of cylinder rods 91 that are displaced outwardly by the air cylinders 90. A roller 110 secured to each of the roller mounts 92 is adapted to engage a receptacle (not shown) on the tool 56 which indexes them vehicle 52 to particular positions along the tool 56.

Figure 11:
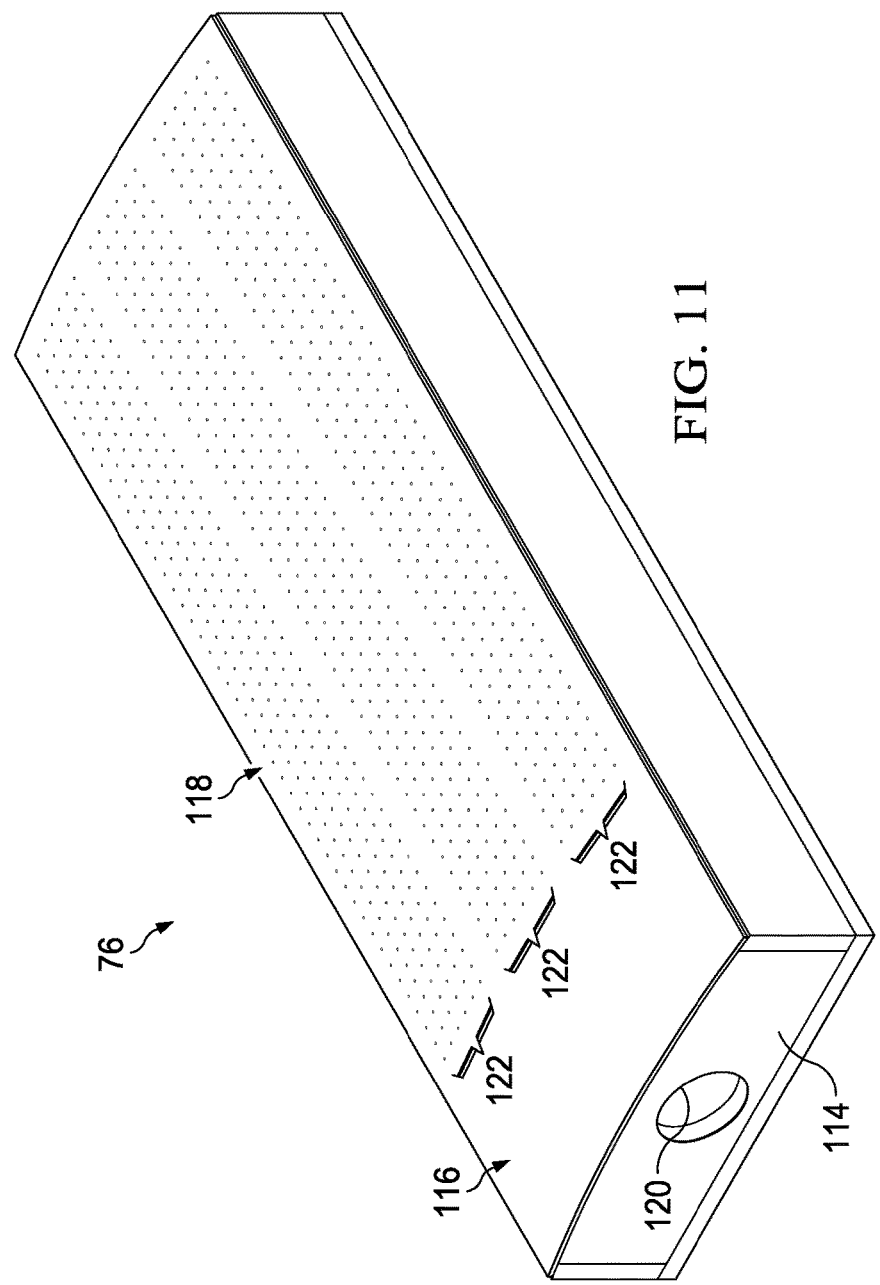
FIG. 11 is an illustration of a perspective view of one embodiment of a transfer platen carried on the mobile vehicle.
Figure 12:
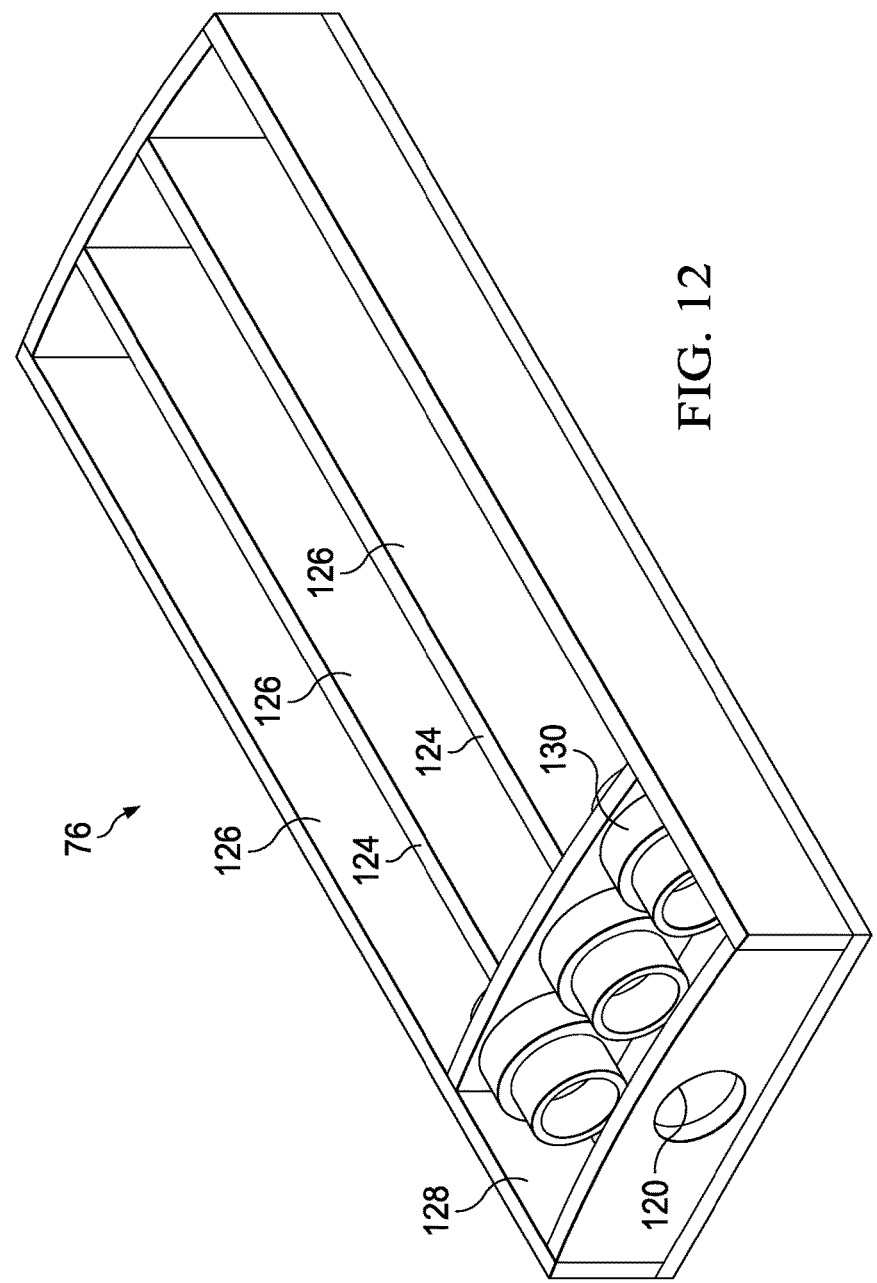
FIG. 12 is an illustration similar to FIG. 11 but having the face of the platen removed to reveal interior details.
Figure 16:
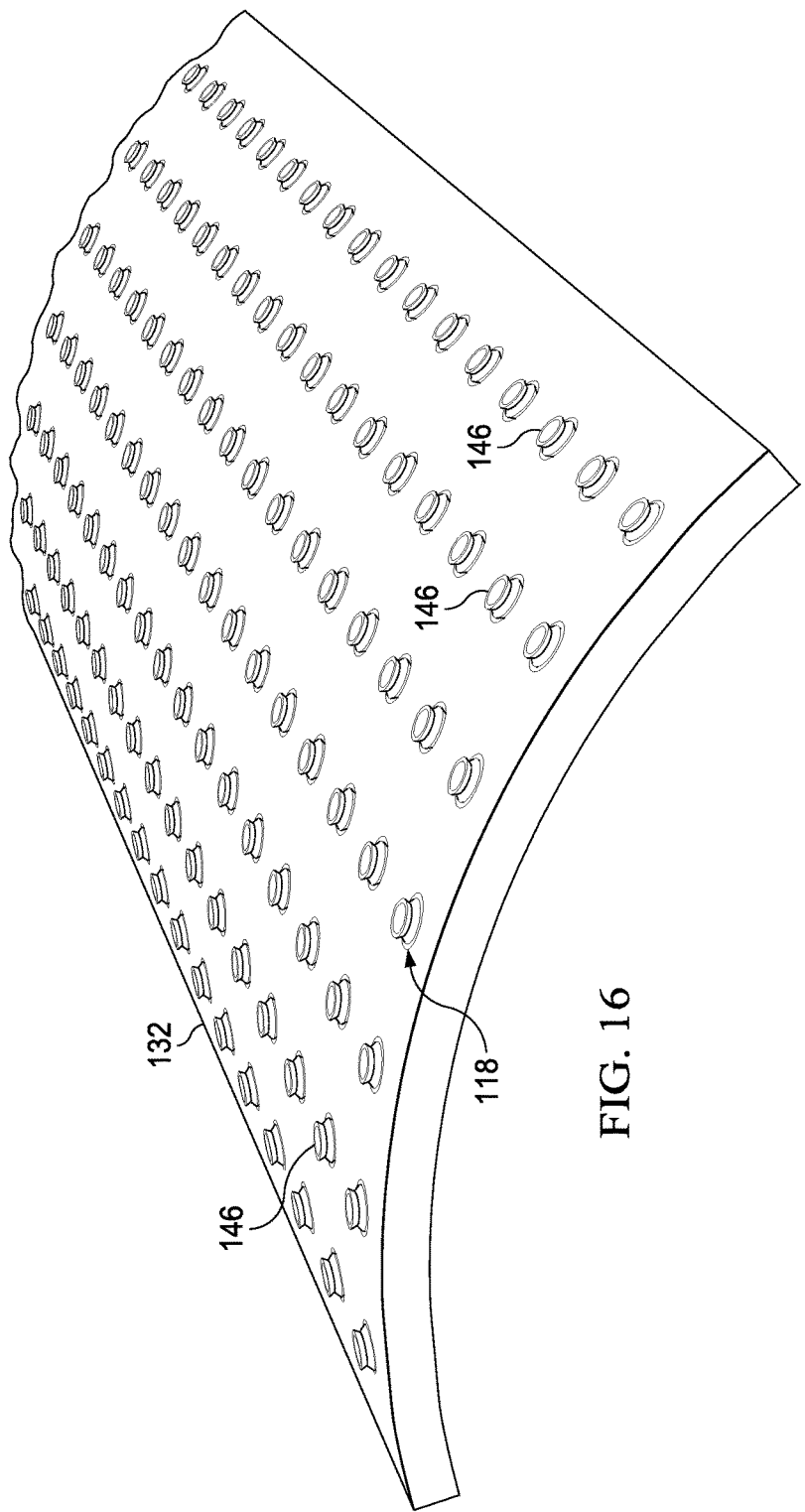
FIG. 16 is an illustration of a perspective view of a cover and suction cups forming part of the transfer platen shown in FIGS. 14 and 15.
Figure 17:
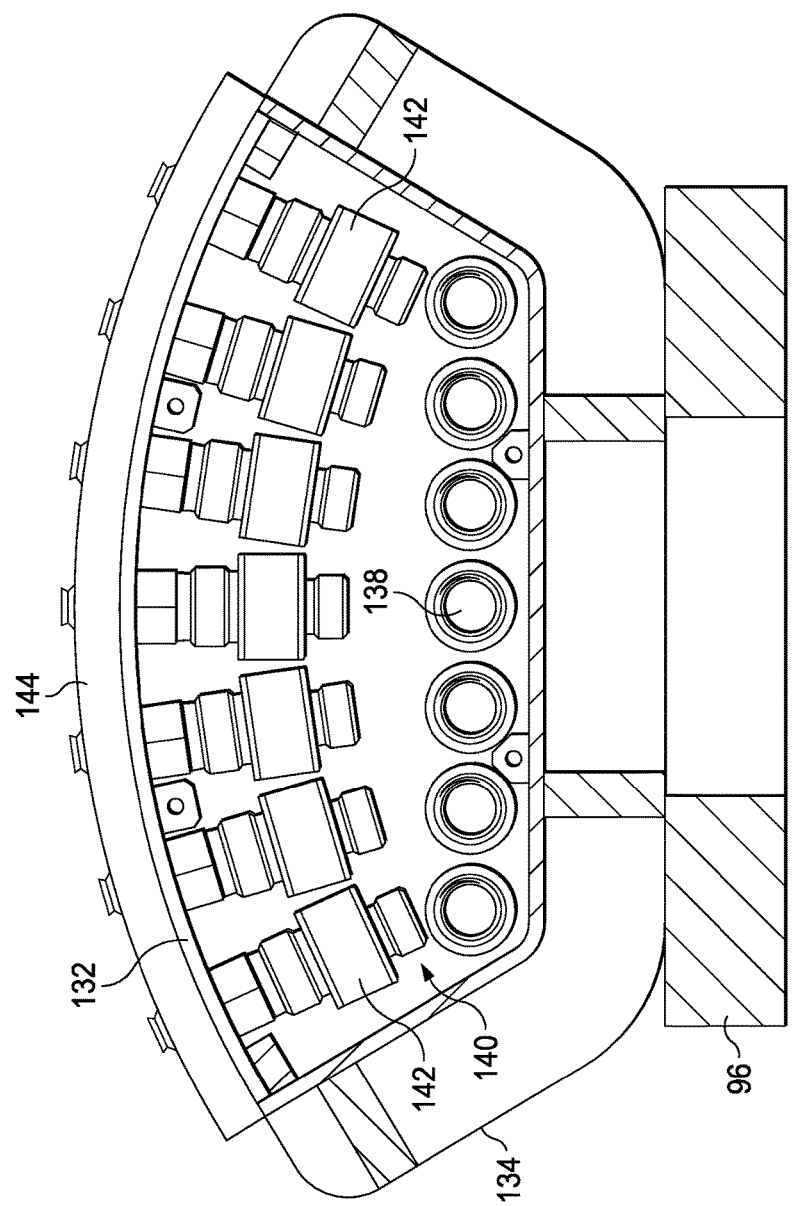
FIG. 17 is an illustration of a cross-sectional view taken along the line 17-17 in FIG. 15.
Figure 18:
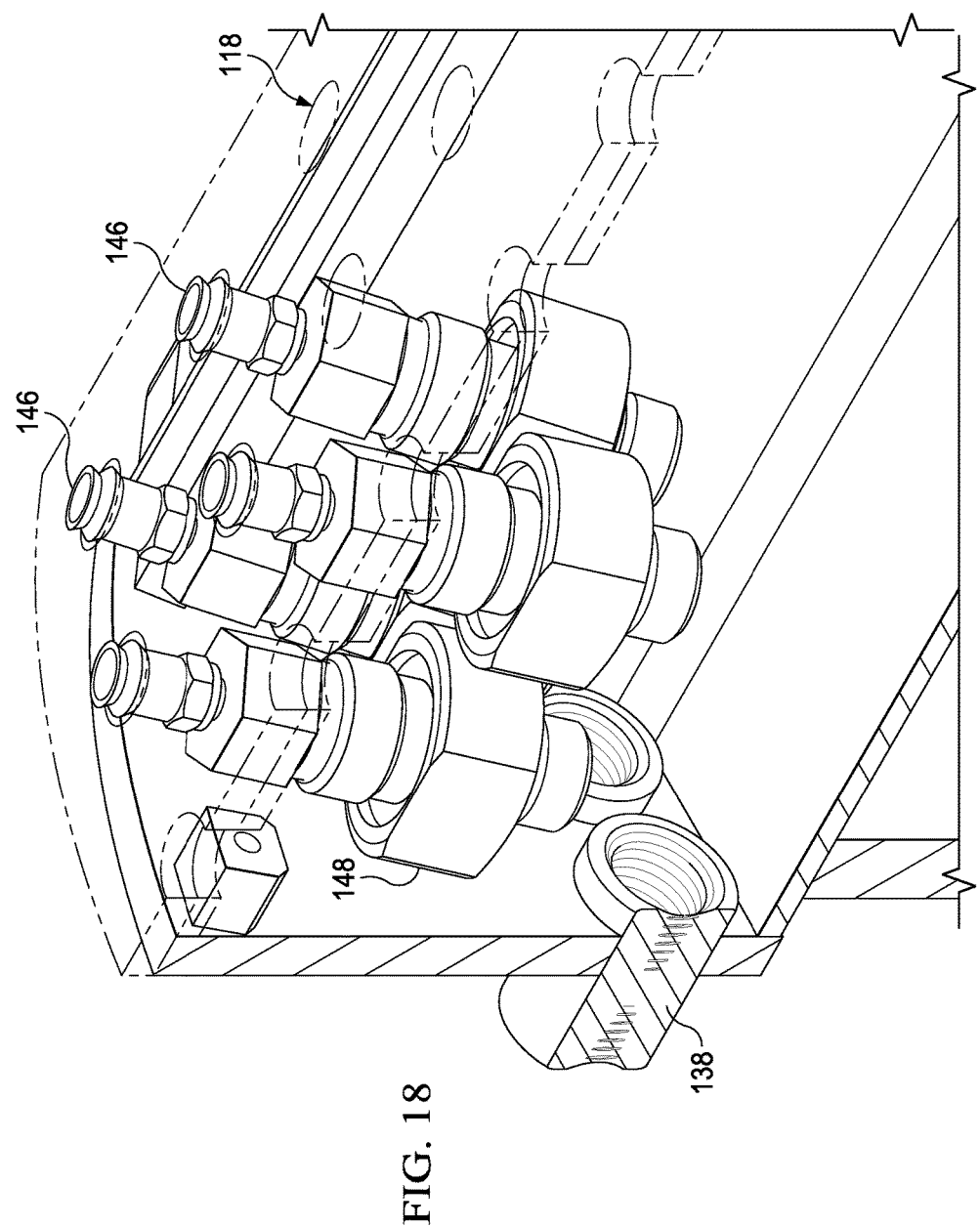
FIG. 18 is an illustration of a perspective view of a portion of the transfer platen shown in FIGS. 14 and 15, parts broken away to reveal individual vacuum control valves.

Attention is now directed to FIGS. 11-13 which illustrate further details of one embodiment of the platen 76 which is used to pick up a composite ply 86 or a group of plies 86 from the drawers 66 and then transfer and place them onto the tool 56. An airtight housing 114 has a generally open interior and a curved, ply engaging face 116. The face 116 includes a plurality of perforations 118 therein which communicate with the open interior of the housing 114. The perforations 118 may be arranged in groups that form a vacuum pickup system that includes vacuum zones 122 for purposes that will be later discussed. Although three groups of the perforations 118 are shown in FIG. 11, any number of groups and arrangement of the groups are possible.

The housing 114 is provided with an exhaust outlet 120 in one end thereof which communicates with a collection chamber 128 (FIG. 12). The collection chamber 128 is respectively connected by three control valves 130 to three corresponding, separated chambers 126 formed by internal partitions 124. Each of the internal chambers 126 is positioned beneath a group of the perforations 118 forming the zones 122. Although not shown in the drawings, the valves 130 are controllable to either connect or shut off the internal chambers 126 with the collection chamber 128. As shown in FIG. 13, a pair of flanges 96 secured on the back of the housing 114 are adapted to the releasably couple with the quick change tool interfaces 75 on the manipulators 72.

The exhaust outlet 120 is adapted to be coupled with the vacuum control system 78 (FIG. 1) which draws a vacuum within the housing 114. This vacuum draws air through the perforations 118 into the interior of the housing, creating a vacuum on the platen face 116 which holds one or more plies 86 against the platen 76 during pickup, transfer and placement of the plies 86. The valves 130 control which of the zones 122 have vacuum pressure. The ability to control the applied vacuum over the face 116 aids in releasing the ply 86 during placement on the tool 56, and may also be useful in selectively picking up the plies 86 from the drawers 66, as will be discussed below in more detail. Although not shown in the drawings, the outer curved face 116 may include a layer of compliant material, and/or a coating or layer of nonstick material such as Teflon® to aid in release of the plies 86 during the placement process.

FIGS. 14-18 illustrate another embodiment of the platen 76 for picking up, transferring, placing and compacting plies 86 on the tool 56. A sealed housing 132 is mounted on an outer rigid frame 134 that is provided with a flange 96 releasably coupling the platen 76 with the quick change tool interfaces 75 on one of the manipulators 72. The housing 132 may be manufactured from any suitable rigid material such as sheet metal or a composite. The housing 132 has an open interior and a generally curved, ply engaging outer face 136 provided with a plurality of perforations 118 therein.

A layer 144 of compliant material covers the face 136 and has perforations therein aligned with the perforations 118 in the housing 132. A plurality of vacuum sensing control valves 148 are aligned with the perforations 118 and include suction cups 146 that extend through the perforations 118 and engage the inner face of the compliant layer 144. The control valves 148 are capable of sensing when a vacuum is not pulled as a result of a ply 86 not overlying a corresponding suction cup 146, and turning off vacuum to the suction cup when the vacuum is not pulled, as, for example, after a section of a ply has been released during the placement process. The control valves 148 may also function to turn off vacuum over those areas of the platen face 136 that are not in contact with a ply 86 when the ply 86 is initially picked up from a drawer 66. Although not shown in the drawings, the groups of control valves 148 are connected through air lines to the exhaust outlets 138 which allow for the creation, as needed, of individual suction zones 122 over desired areas of the platen face 136.

Figure 19:
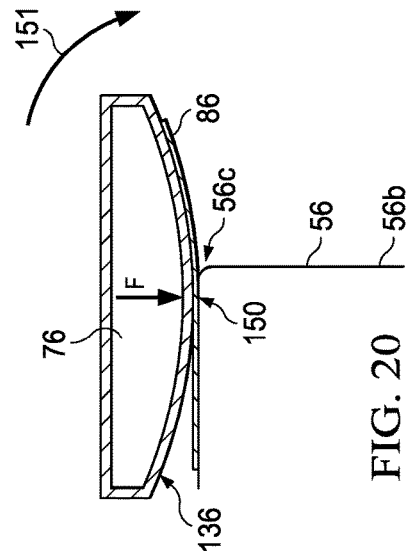
FIGS. 19-22 are illustrations of diagrammatic end views of the transfer platen progressively rolling a ply onto a tool surface.
Figure 20:
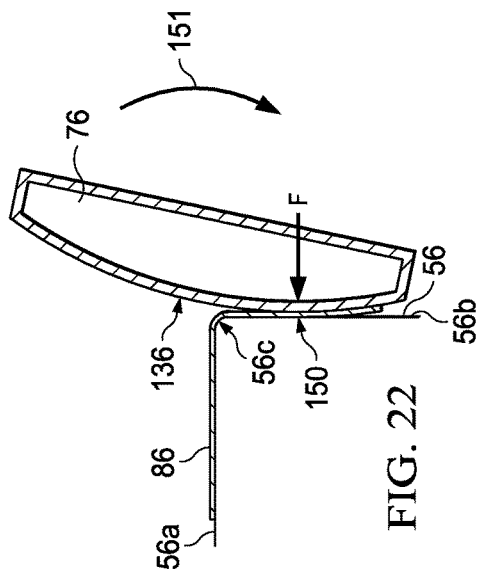

The platen 76 described above in connection with FIGS. 11-18 may be employed in a method of placing plies 86 on a tool 56 having contoured surfaces and/or corners 56c using a rolling or rocking type motion 151 which is illustrated in FIGS. 19-22. Referring to FIG. 19, in one example, the tool 56 includes first and second flat legs 56a, 56b that are connected together along an outside radius corner 56c. The platen 76 is initially manipulated to bring an edge of the ply 86 into nearly line contact with a first flat leg of the tool 56a. Then, as shown in FIG. 20, with a rolling or rocking motion 151, the platen 76 is pivoted, rolling on successive portions of the ply 86 down onto the second flat leg of the tool 56b as the portions are rolled off of the platen 76. This rolling static contact between the ply 86 and the tool 56 may eliminate the need for a ply carrier or ply backing paper on the ply 86.

Figure 21:
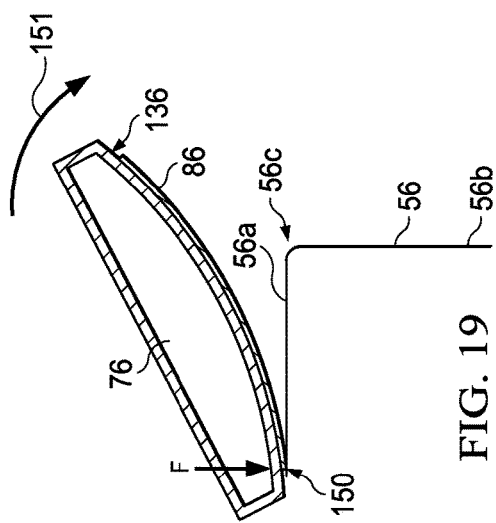
Figure 22:
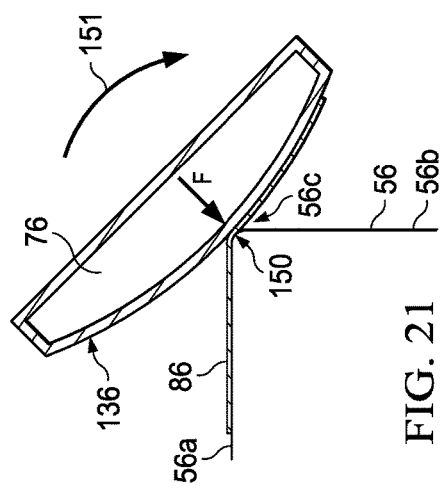

Referring to FIG. 21, when layup of the ply 86 reaches the tool corner 56c, the rolling motion 151 of the platen 76 is continued, causing the platen 76 to pivot around the tool corner 56c. As the platen 76 pivots around the tool corner 56c, the ply 86 is released from the platen face 136, wrapping the ply 86 smoothly around and onto the tool corner 56c. FIG. 22 shows a further stage in which the remaining portions of the ply 86 are laid down over the flat second leg 56b of the tool 56.

As the platen is applied to the ply 86 by the platen face 136 in a manner which successively releases portions of the ply 86 that are brought into contact with the tool 56. This staged release of the ply 86 from the platen 76 is achieved by controlling the vacuum applied in the various zones 122 (see FIGS. 11 and 15), and shutting off vacuum in a zone 122 when portions of the ply 86 held over a zone 22 has been placed. In effect, the plies 86 are laid in a "roll-on roll-off" process.

Figure 23:
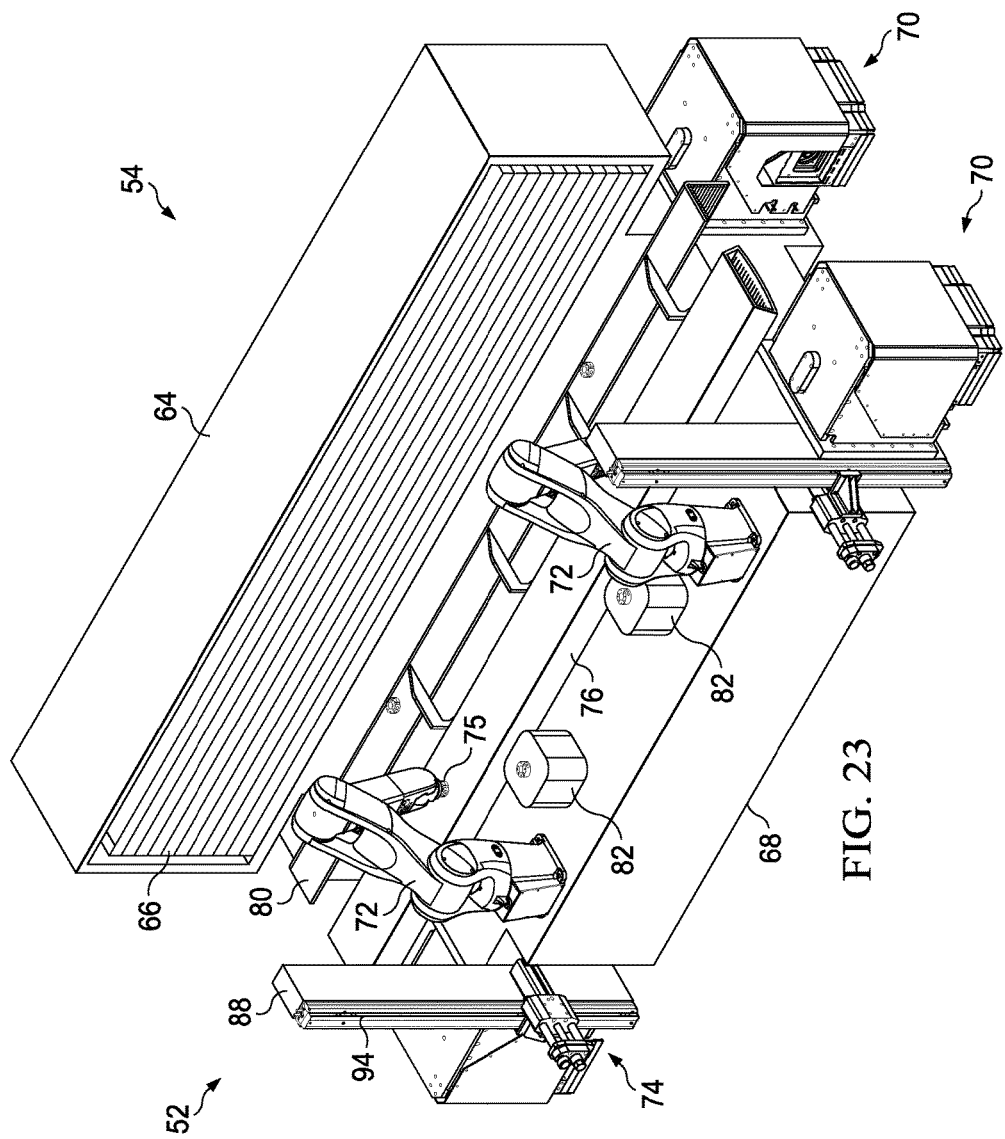
FIGS. 23-32 are illustrations of perspective views showing use of the mobile vehicle to sequentially carrying out automated pick up, placement, compaction and inspection of plies on a tool.

Attention is now directed to FIGS. 23-32 which sequentially illustrate the operations carried out by the vehicle 52 including placing, compacting and inspecting the plies 86 on a tool 56. Referring to FIG. 23, the vehicle is driven to a desired ply placement location along the tool 56 (not shown) where the tool indexers 74 engage the tool 56, thereby indexing the base 68 relative to the tool 56. This is achieved by adjusting the vertical position of the tool indexers 74 relative to the tool 56, and then the using the air cylinders 90 (FIGS. 8 and 9) to drive the rollers 110 into receptacles (not shown) on the tool 56 which lock the base 68 to the tool 56. The wheel assemblies 70 are then adjusted to lower the base 68 into contact with hard points such as a factory floor (not shown) in order to stabilize the vehicle 52 and better react loads resulting from the ply placement and compaction processes.

Figure 24:
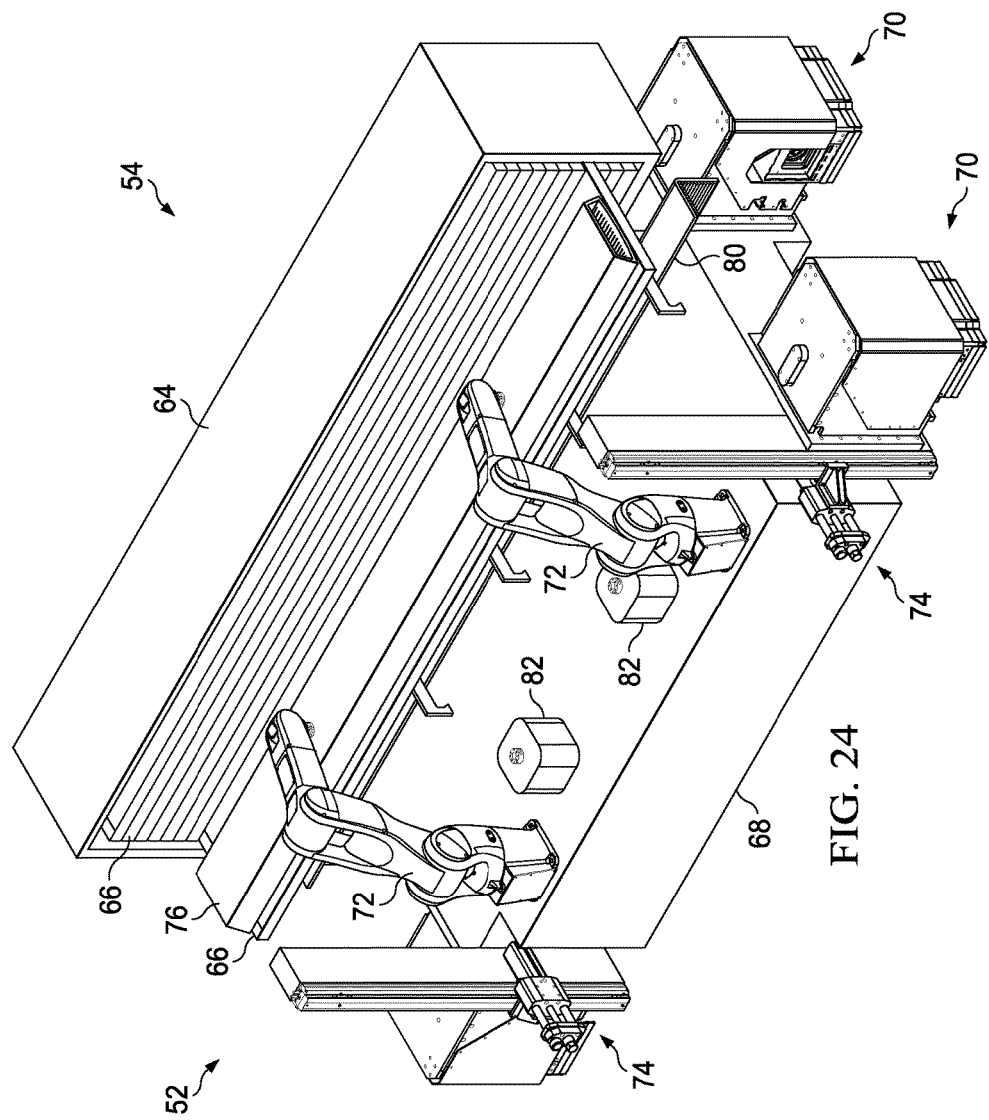
Figure 25:
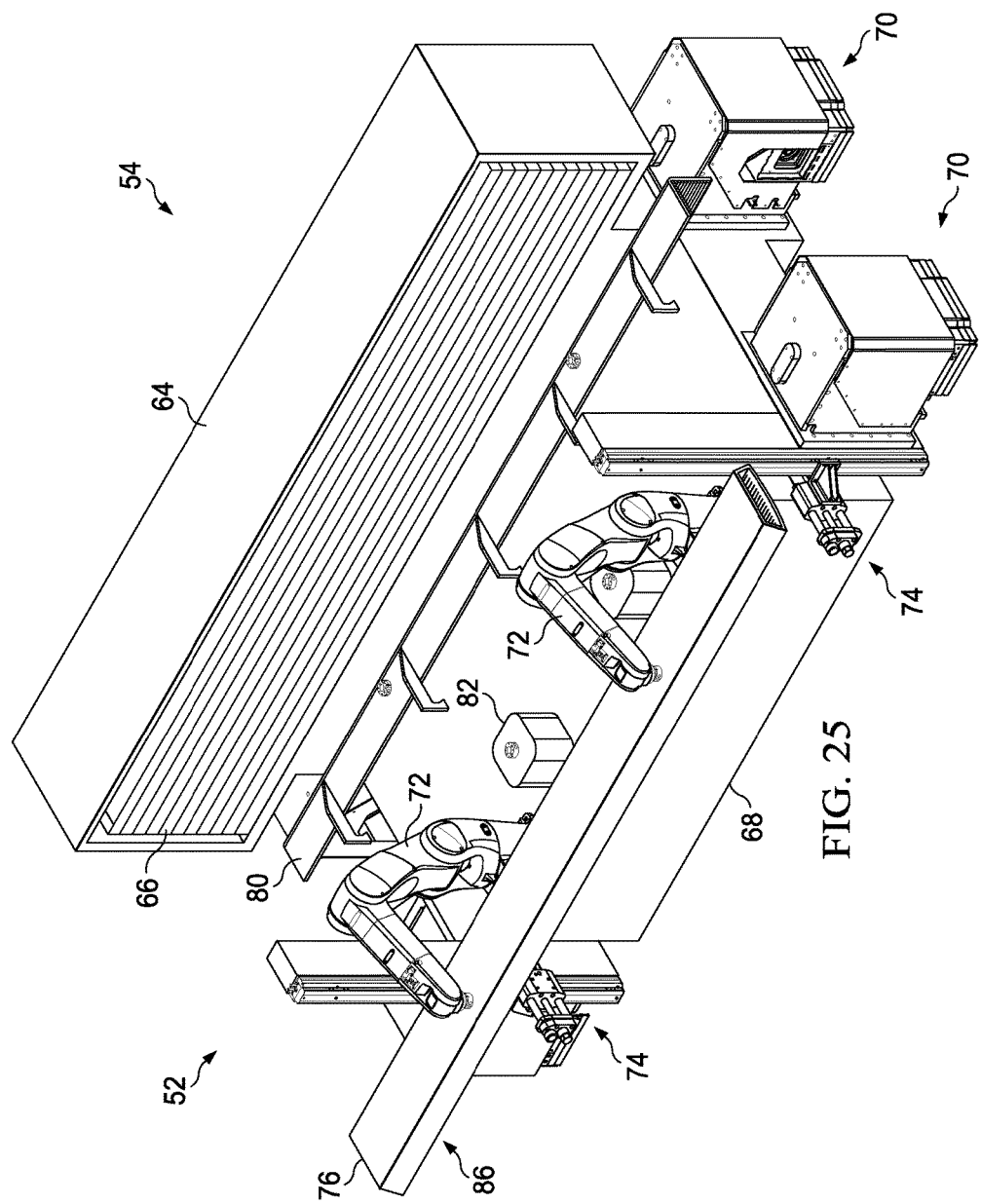
Figure 26:
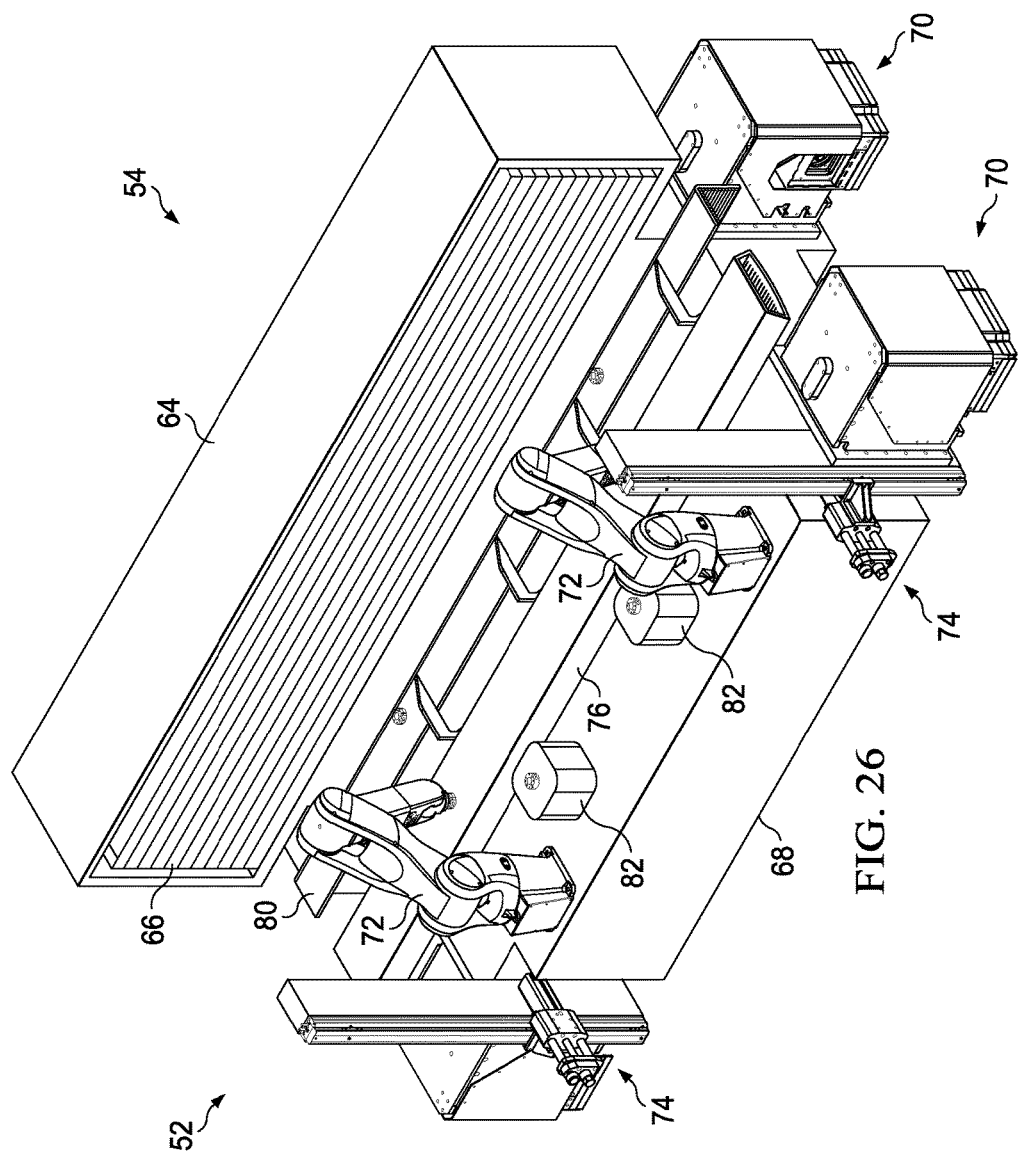

As previously discussed, the drawers 66 of the case 64 are filled, as required, with the necessary plies and/or ply kits for laying up a course of plies at a particular location along the length of the tool 56. As shown in FIG. 24, one of the drawers 66 is pulled open to reveal a ply 86 or kit of plies 86. The manipulators 72 pick up the platen 76 and move it into contact with plies 86 in the opened drawer 66. Using vacuum suction previously described, the platen 76 picks up the plies and, as shown in FIG. 25, the manipulators 72 the move the platen to with the ply 86 attached thereto to a location indexed above the tool 56. The manipulators 72 then proceed to place ply 86 on the tool 56 using the platen rolling method previously described in connection with FIGS. 19-22, and using staged release of the vacuum suction which holds the ply 86 on the platen 76. Following the ply placement, the platen 76 is returned to the base 68 as shown in FIG. 26 and is disconnected from the manipulators 72.

Figure 27:
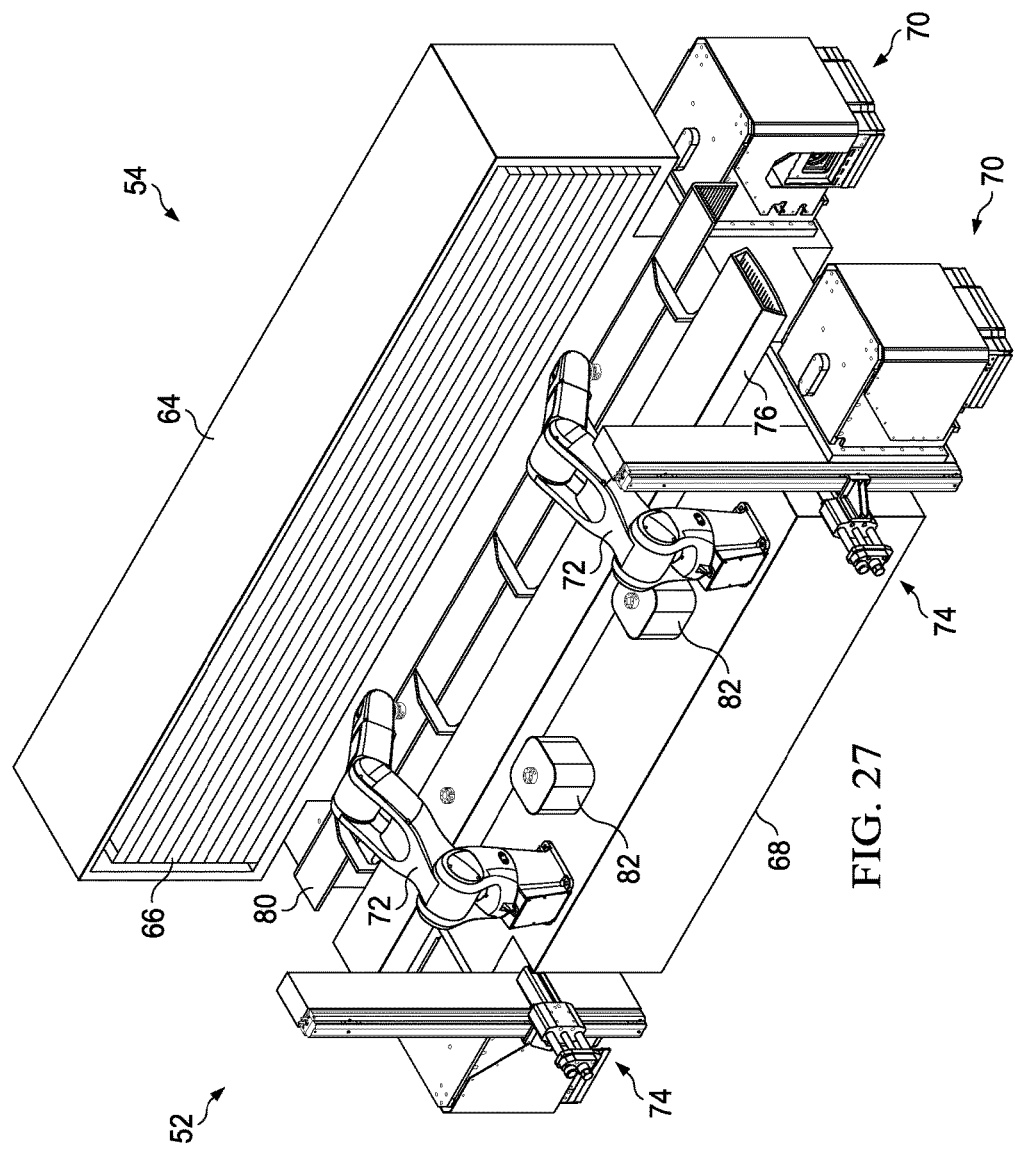
Figure 28:
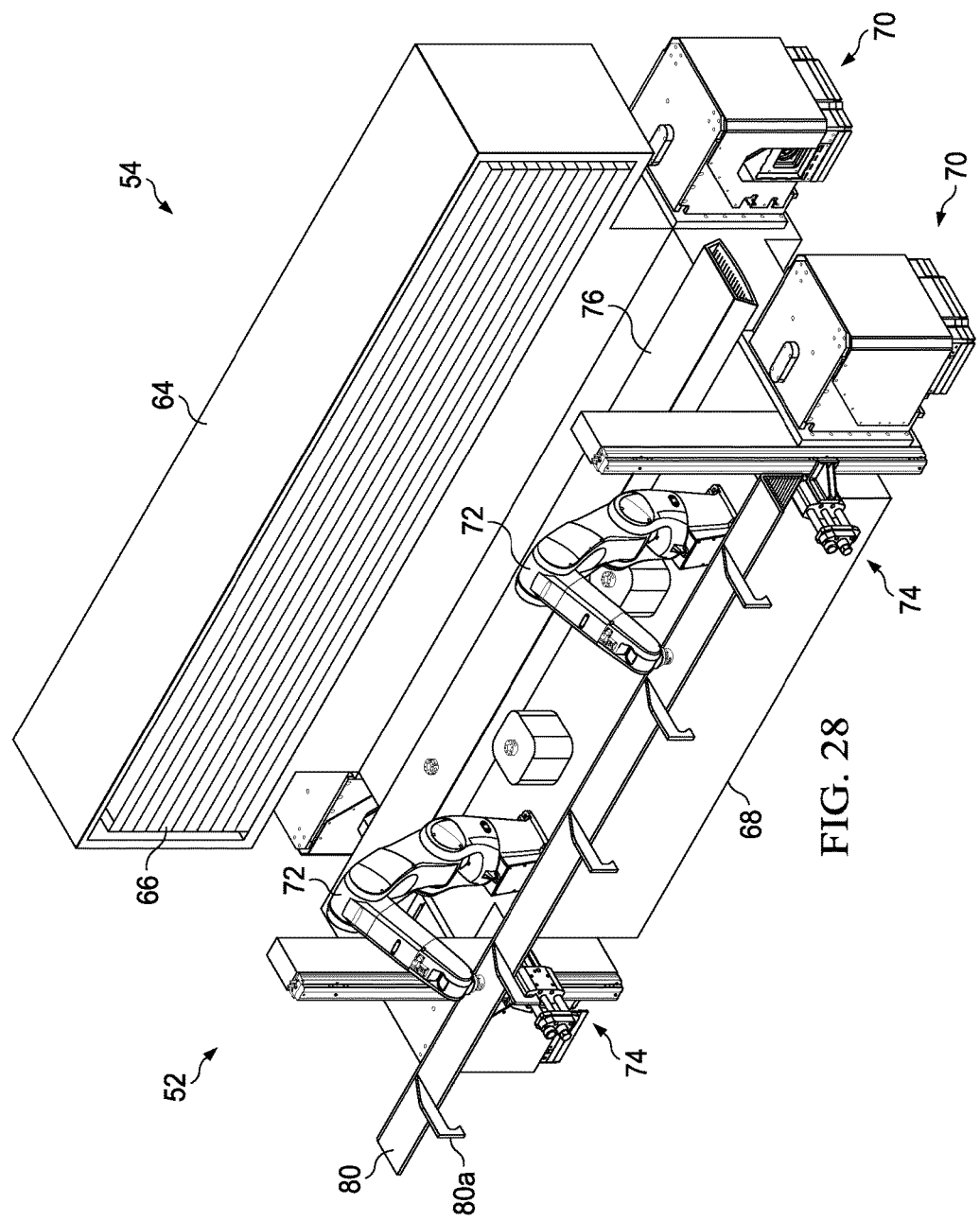

Next, as shown in FIG. 27, the manipulators pick up the compactor 80, and then move it to a position immediately above the tool 56 as shown in FIG. 28. The manipulators 72 locked the hook shaped extensions 80a onto the tool 56 (not shown) and then proceed to move the compactor 80 into engagement with the ply 86 that has just been placed. Using force applied by the manipulators 72, the compactor 80 forms the ply 86 down onto the tool surfaces, following which the tubes or bladder 80b (FIG. 7) are inflated in order to apply an additional compaction force to the formed a ply 86.

Figure 29:
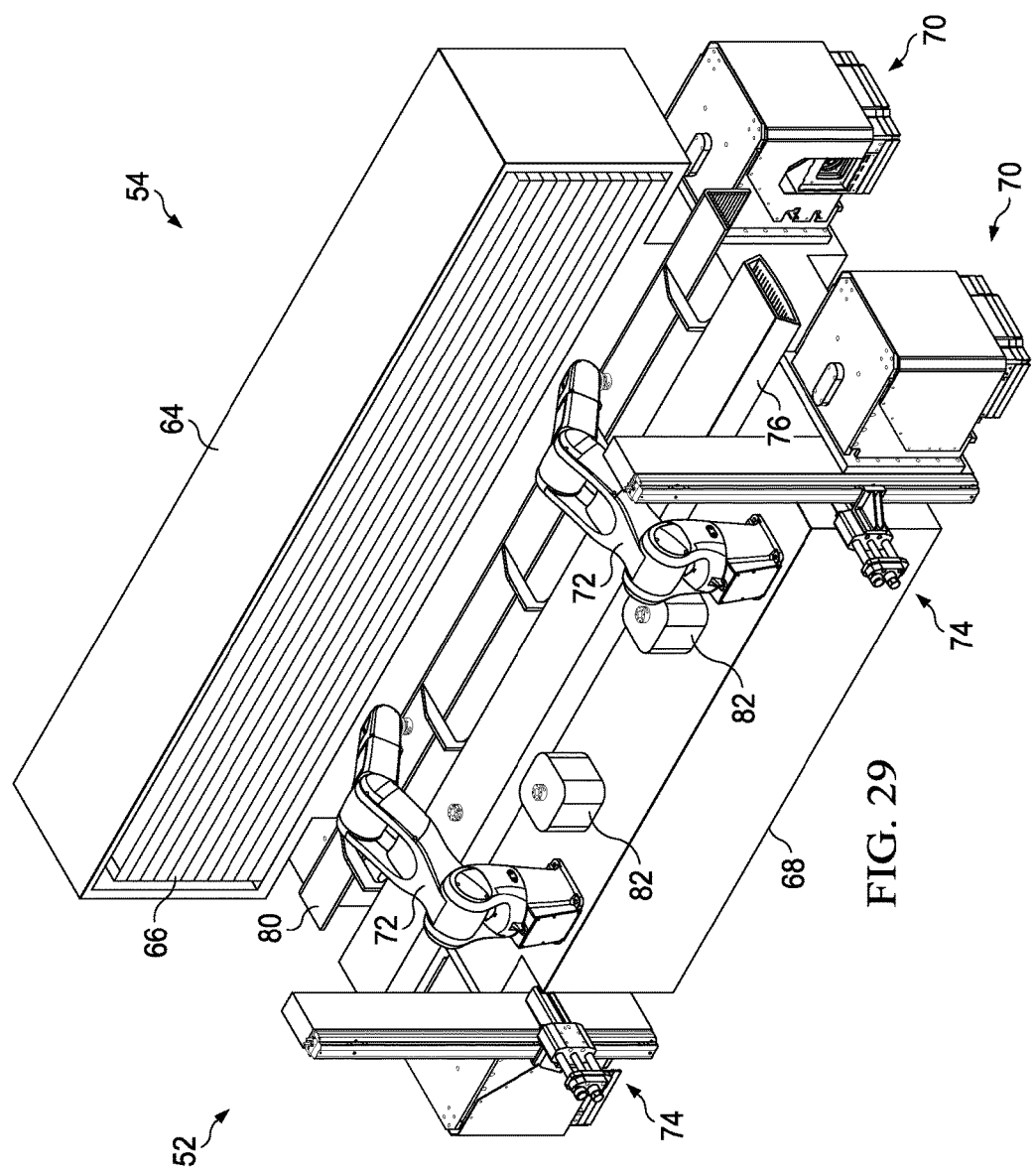
Figure 30:
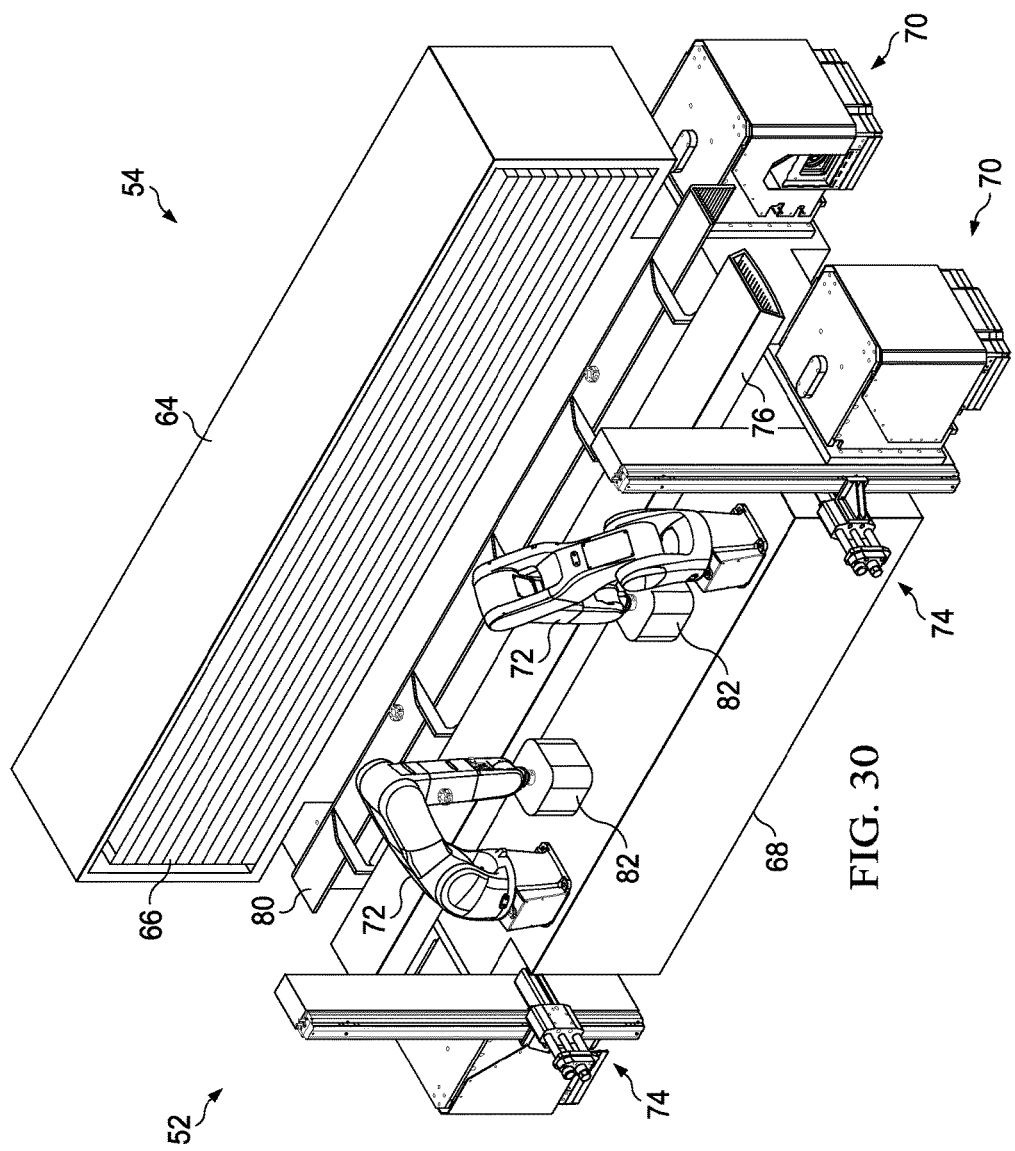
Figure 31:
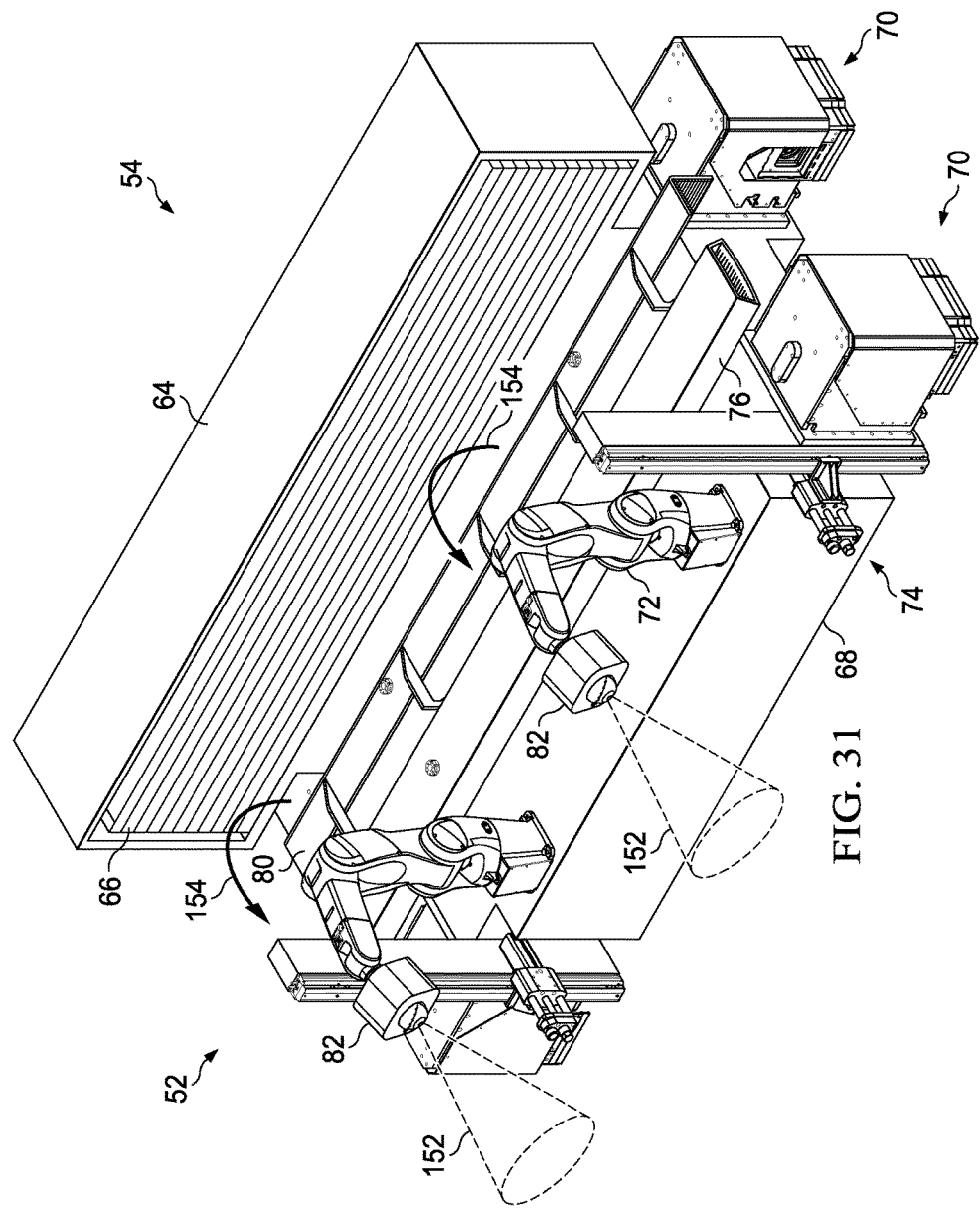
Figure 32:
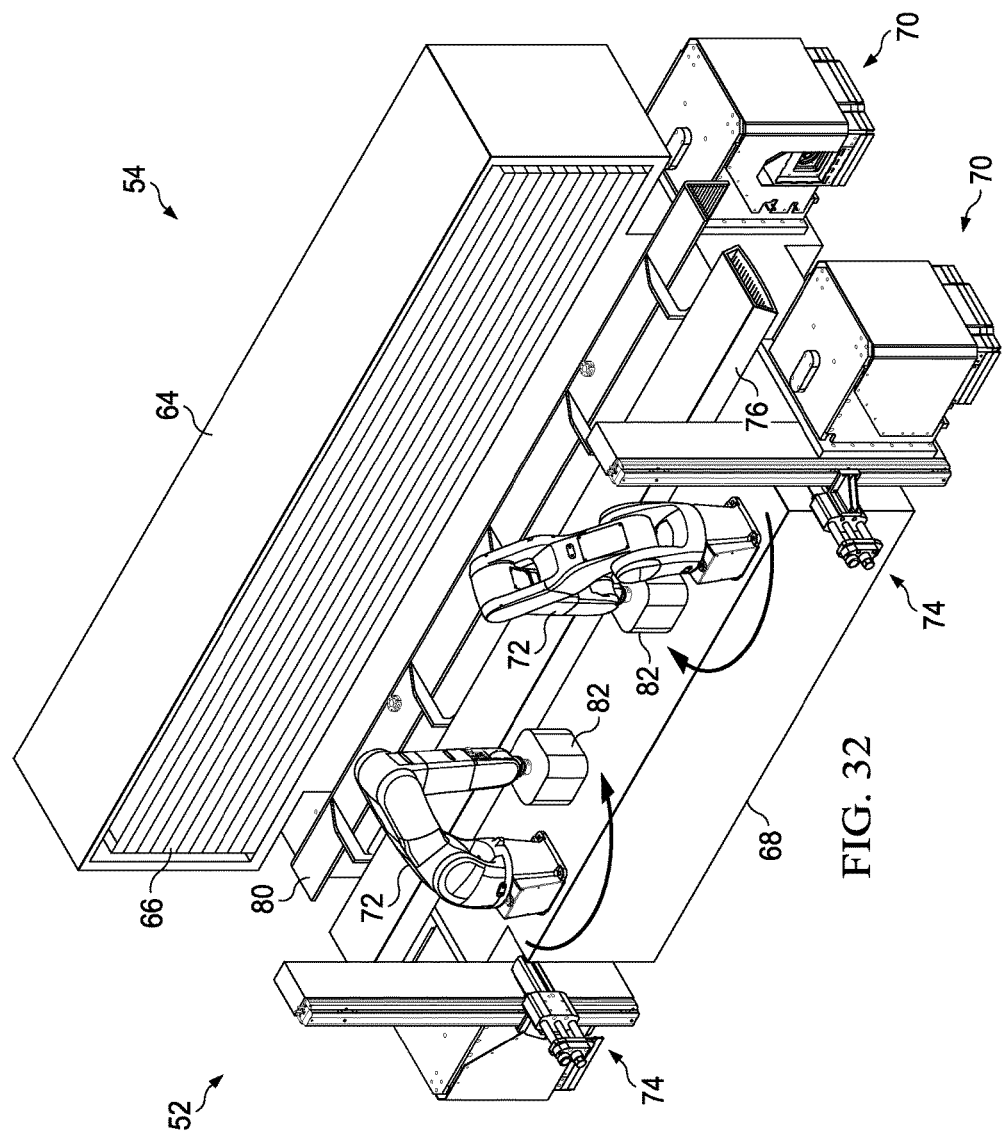

Referring to FIG. 29, following the compaction operation, the compactor 80 is returned to its storage location on the base 68 and is disconnected from the manipulators 72. Then, as shown in FIG. 30, the manipulators pick up inspection devices 82 which, as previously described, may comprise conventional digital cameras, laser line scanners or similar inspection devices. The manipulators 72 move the inspection devices 82 into a position in which the inspection devices 82 may view 152 one or more features of the compacted the ply 86 such as, without limitation, registration of a ply 86 with the tool 56 or an underlying ply 86, or the presence of FOD (foreign object debris). Following the inspection operation, the inspection devices 82 are returned to the base 68, as shown in FIG. 32 and are then disconnected in readiness to repeat the operations described above.

In one embodiment, when all of the plies in the case 64 have been placed, the vehicle 52 may return to a ply source 84 (FIG. 1), such as a ply kit staging location, where the drawers 66 of the case 64 are replenished with additional plies that are to be laid up at the same or a different location along the tool 56. In another embodiment, a robot or similar vehicle may move alongside the vehicle 52, and remove and exchange the empty case 64 with a replacement case 64 containing a fresh supply of plies 86.

Figure 33:
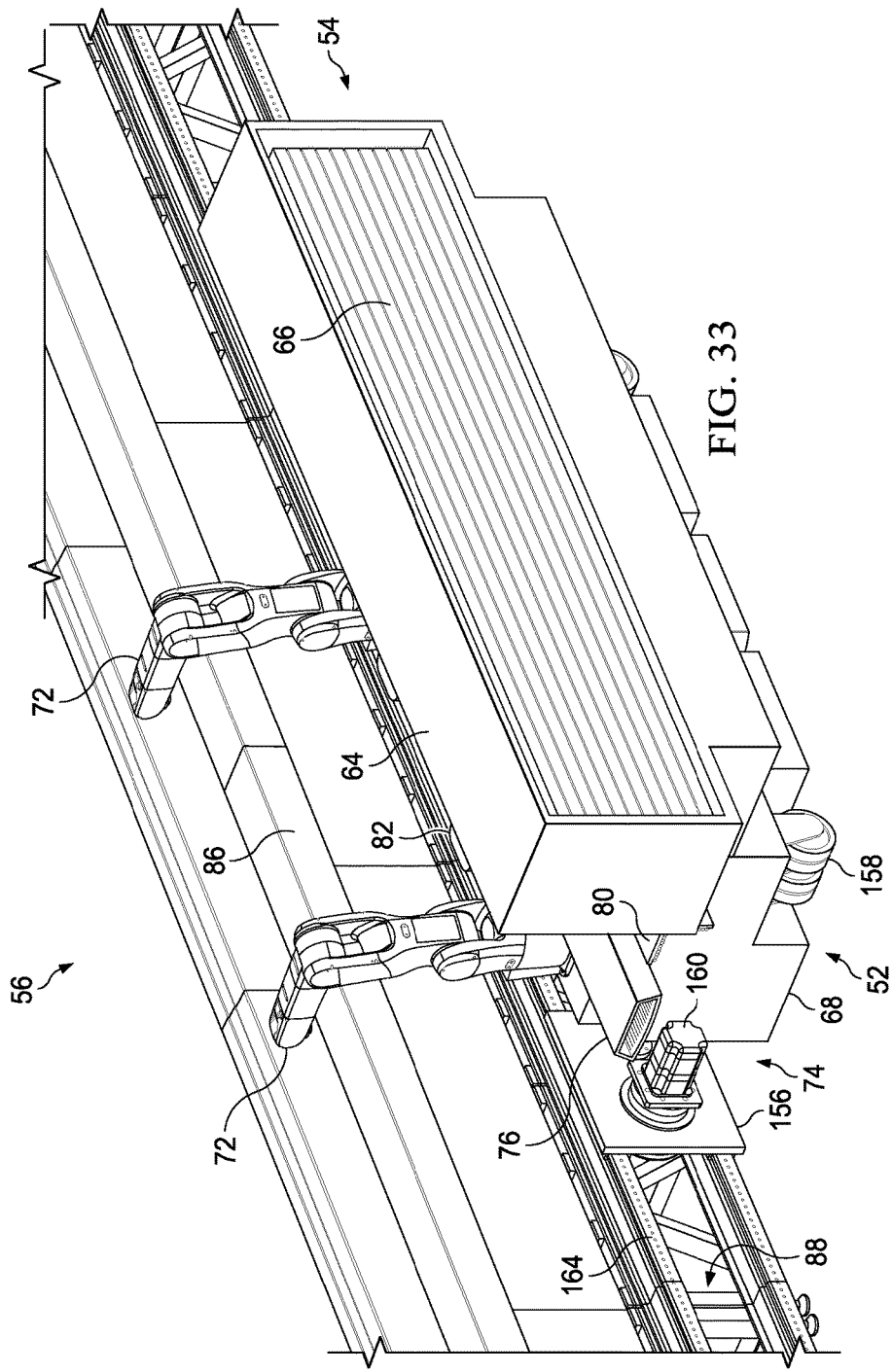
FIG. 33 is an illustration of a perspective view of an alternate embodiment of the mobile vehicle attached to and guided along a tool.
Figure 34:
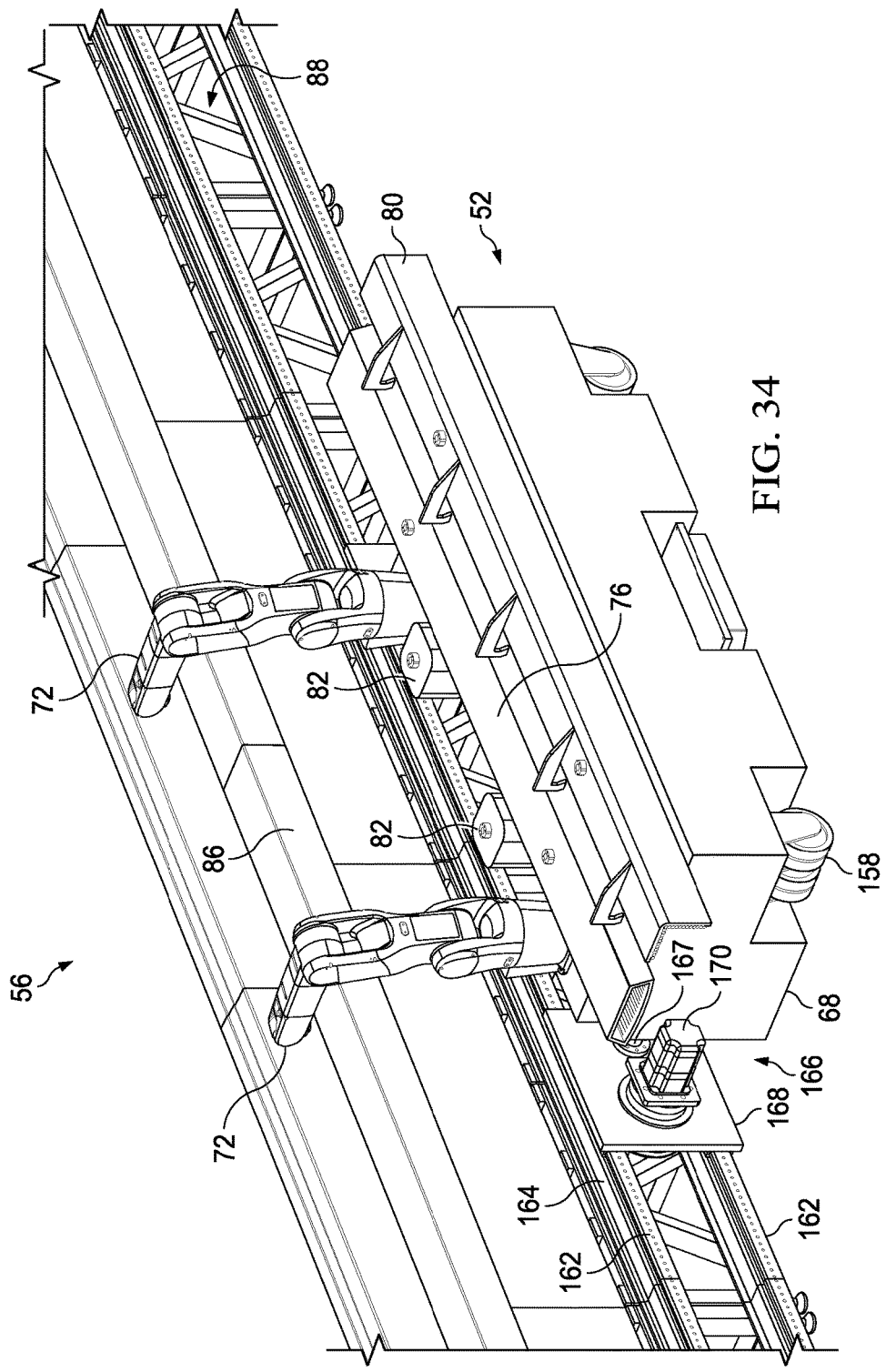
FIG. 34 is an illustration similar to FIG. 34, but showing the mobile vehicle awaiting delivery of a replacement ply drawer.
Figure 35:
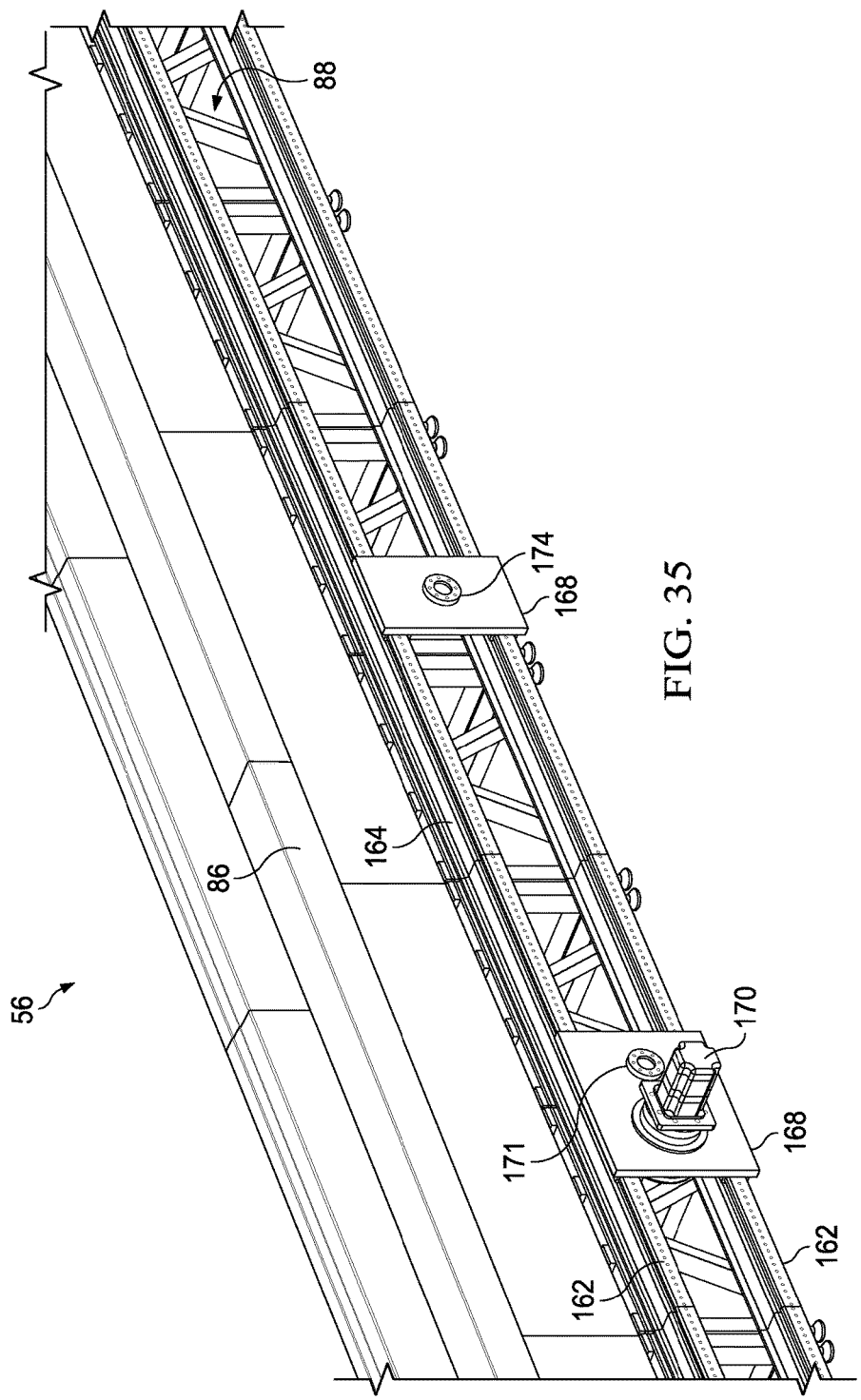
FIG. 35 is an illustration similar to FIG. 34, but showing the vehicle removed to reveal sleds on the tool.

FIGS. 33-35 illustrates an alternate, simplified embodiment of the vehicle 52 having a ply supply 54 that is removably attached to the back or outer side of the base 68. The base 68 is partially supported by rollers 158 which allow the vehicle 52 to roll along a factory floor (not shown), powered by an off-board drive 166 discussed below. The base 68 is equipped with a platen 76, compactor 80, inspection devices 82 and a pair of robotic manipulators 72. The front or inner side of the base 68 is coupled with and guided along a pair of linear guide rails 162 attached to the elevated base 89 which supports the tool 56. Active and passive sleds 168, 172 respectively are mounted for sliding movement along the rails 162.

The active sled 168 is provided with an electric drive motor 170 which is connected through a pinion gear (not shown) that engage a rack 164 mounted along one of the rails 162. The active sled 168 also may provide location feedback to the controller as well as feed power and air to the vehicle 52. The sleds 168, 172 respectively include receptacles 171, 174 for receiving connecting arms 167 (FIG. 34) that project laterally outward from the base 68 and function to connect the base 68 with the sleds 168, 172. Thus, in this embodiment, the vehicle 52 relies on an off-board drive system 166, thereby reducing weight and complexity of the vehicle 52, while facilitating desired indexing of the base 68 relative to the tool 56.

Figure 36:
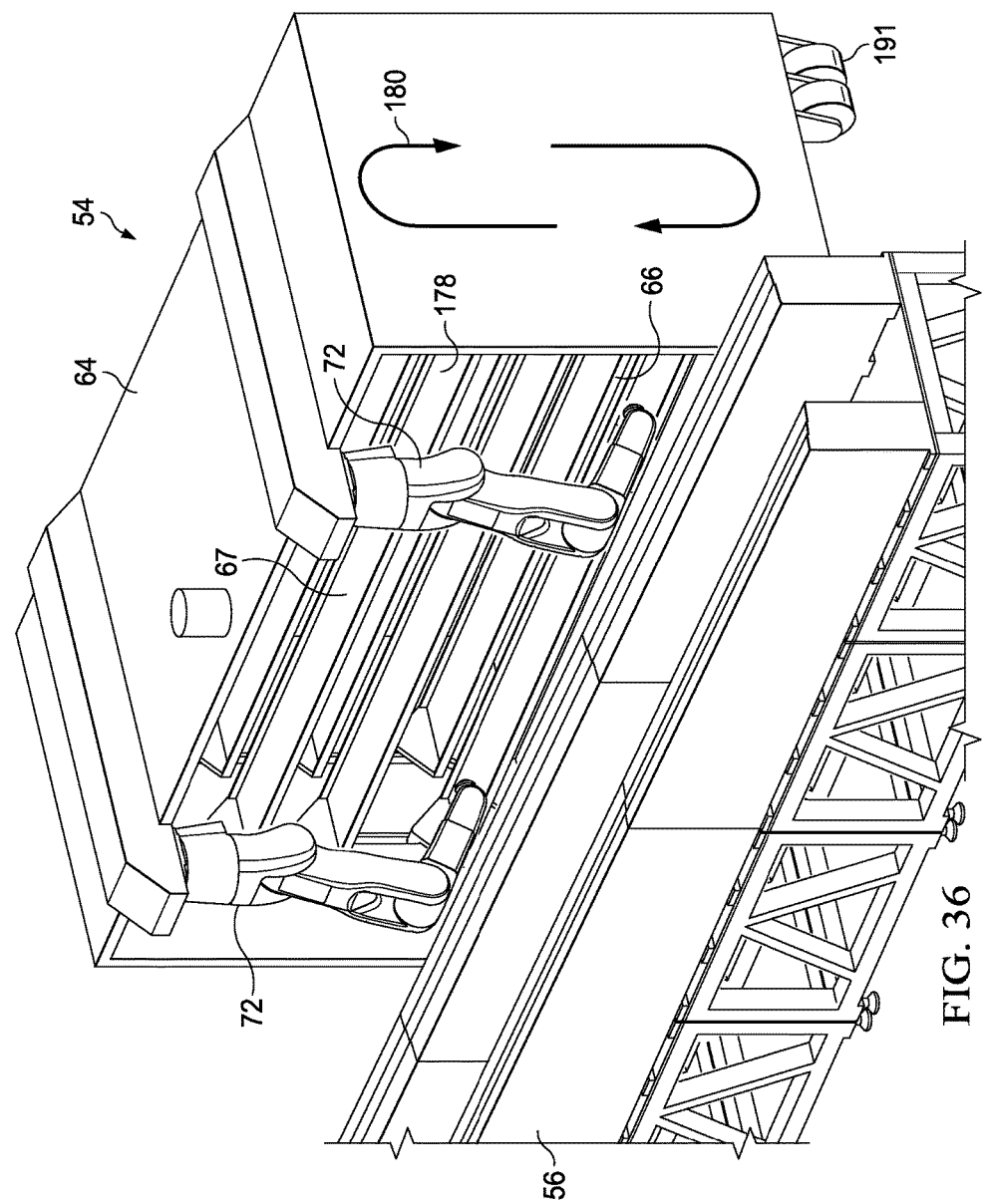
FIG. 36 is an illustration of a perspective view of an alternate form of the mobile vehicle having on-board robots for removing and placing plies on the tool.

FIG. 36 illustrates a further embodiment in which the ply supply 54 comprises a mobile case 64 mounted on the wheels 191, allowing the ply supply 54 to be transported between a ply loading station and indexed locations along a tool 56 where other equipment place and compact the plies on to the tool 56. The case 64 includes a plurality of trays 67 each containing one or more plies that are to be placed and the compacted on the tool 56. The trays 67 may be mounted on a rotisserie-like mechanism (not shown) for movement in an endless loop 180. Manipulators 72 such as articulated robots, are mounted on the case 64 and are operative to pick and place the plies onto the tool 56.

Figure 37:
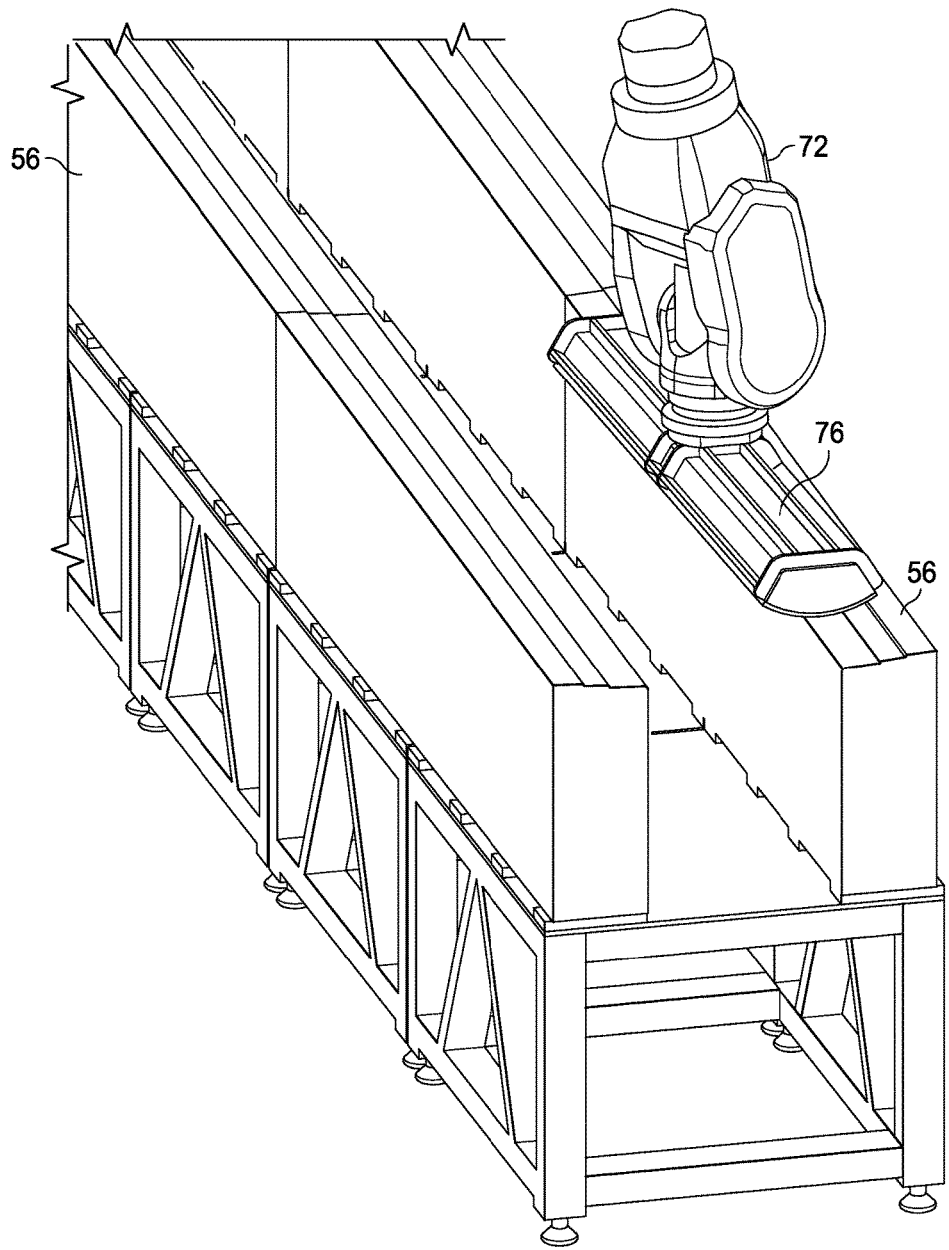
FIG. 37 is an illustration of a perspective view showing the transfer platen mounted on a robot movable along the length of a tool.

FIG. 37 illustrates alternate equipment for picking up and placing plies on either of a pair of tools arranged side-by-side. In this example, the vacuum assisted platen 76 is mounted on an articulated robot 72 that manipulates the platen 76 to pick up and place plies from a ply supply such as that shown in FIG. 36, onto the tools 56. Compactors 80 manipulated by the robots 72 compact plies 86 that have been placed on the tools 56.

Figure 38:
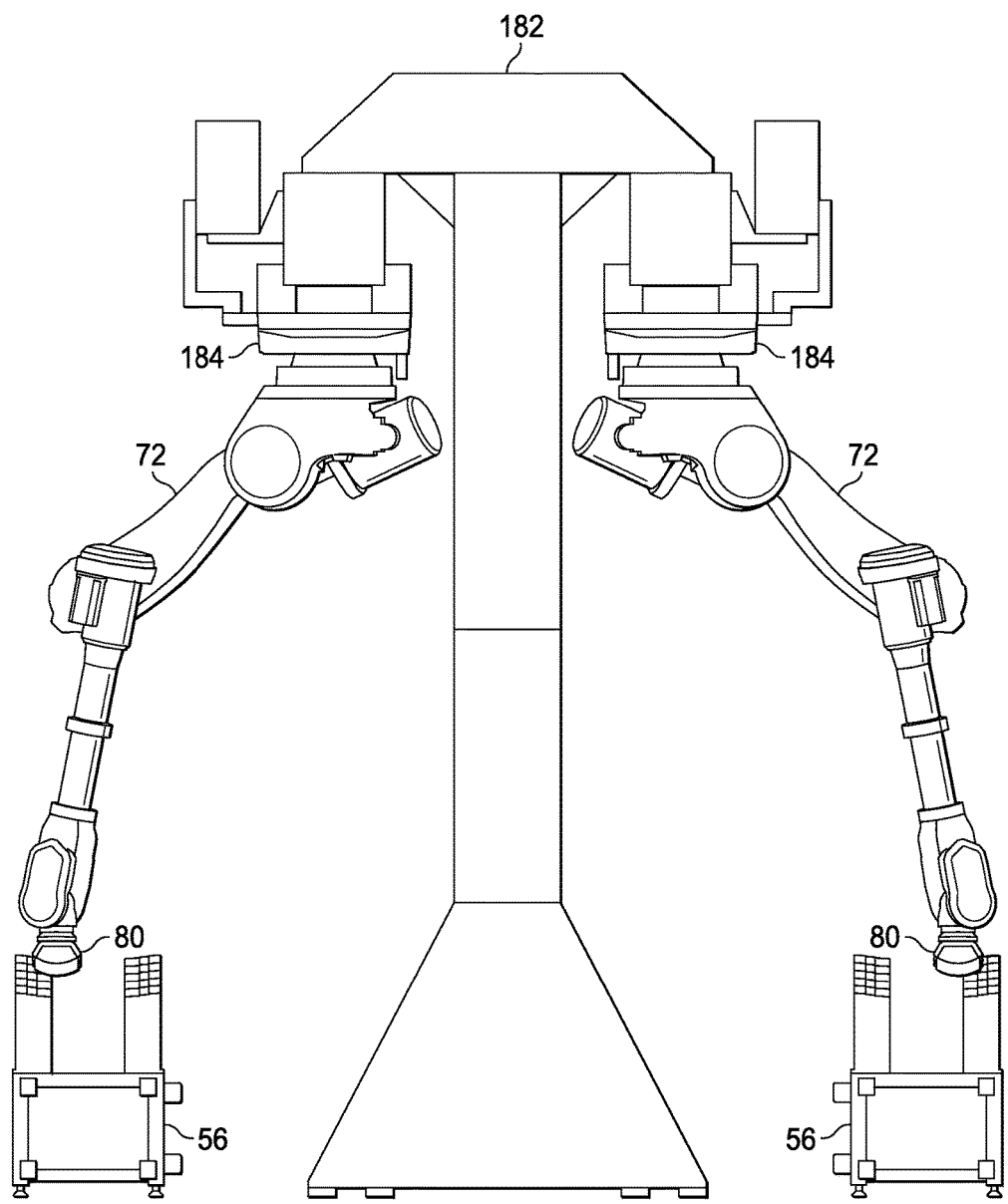
FIG. 38 is an illustration of an end view showing mounting of a pair of the robots for movement along the length of the tool.

FIG. 38 illustrates an alternate embodiment in which a pair of articulated robots 72 are mounted for movement along the rails 184 supported on a tower 182 located between a pair of tools 56. The robots control end effectors such as compactors 80.

Figure 39:
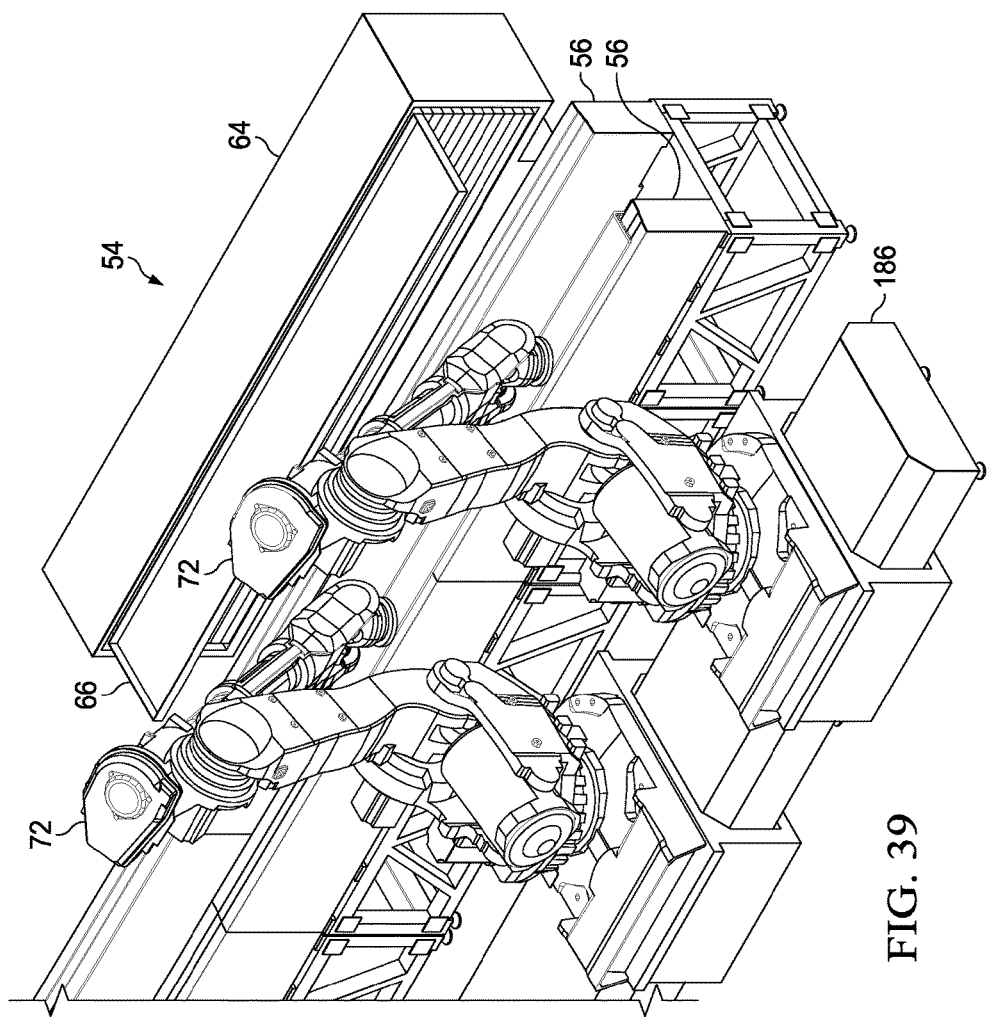
FIG. 39 is an illustration of a perspective view showing an alternate arrangement for mounting a pair of robots for movement along the length of the tool.
Figure 40:
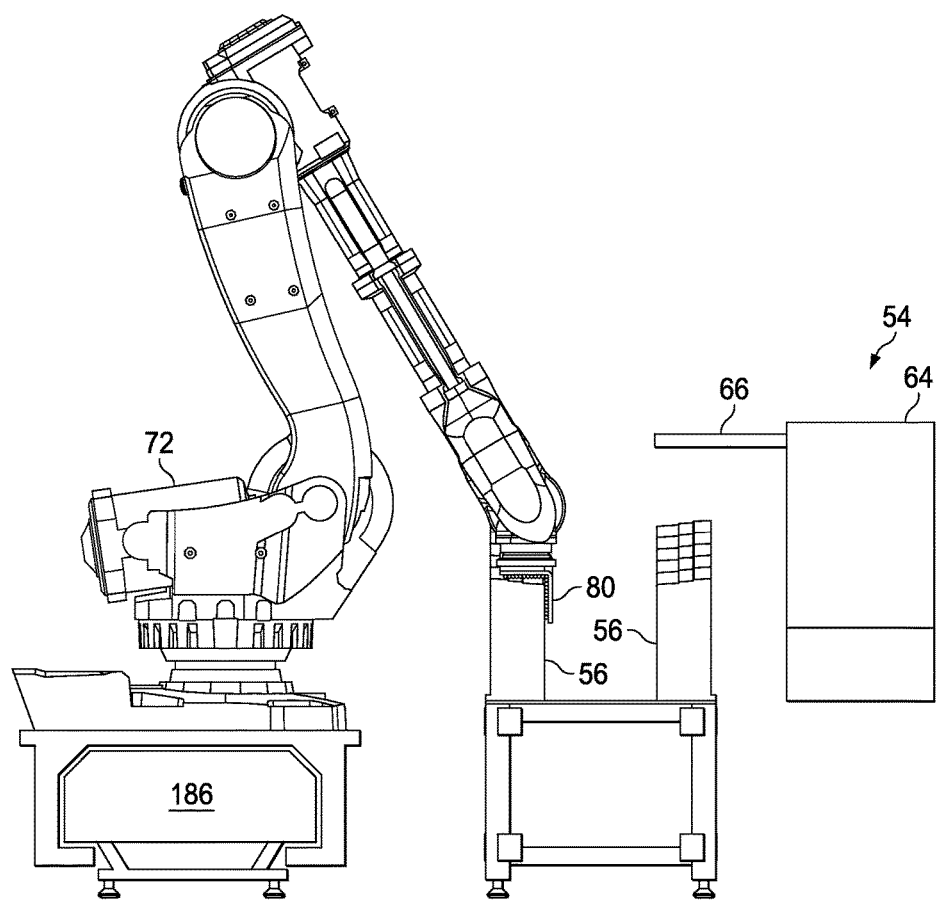
FIG. 40 is an illustration of an end view of the robots and tool shown in FIG. 40.

FIGS. 39 and 40 illustrates another embodiment of the equipment in which a pair of robots 72 are mounted for linear movement along a rail 186 on one side of a pair of the tools 56. A ply supply 54 comprising a case 64 having drawers 66 loaded with plies is positioned on the opposite side of the tools 56. The robots 72 may be employed to pick plies from the drawers 66, place them on the tools 56, and then compact the plies 86. A third sequential robot (not shown) may be added to perform inspection activities, thereby eliminating the need for changing the end effector or manual intervention.

Figure 41:
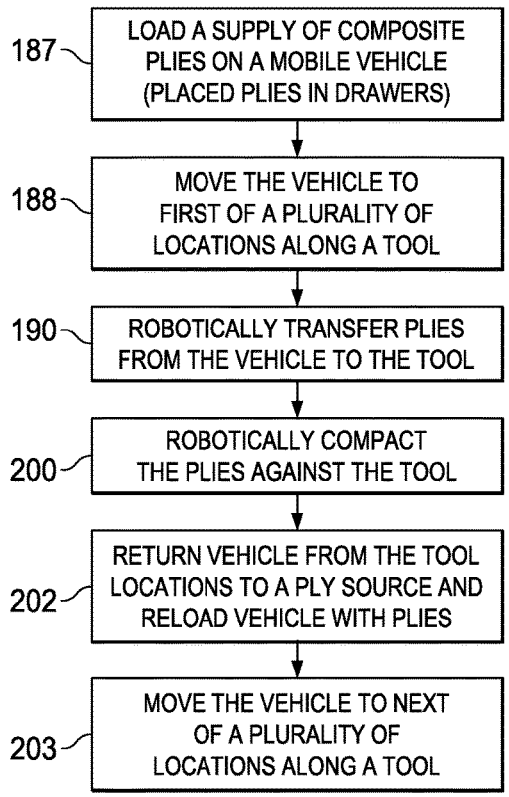
FIG. 41 is an illustration of a flow diagram of a method of automated ply placement and compaction.

Attention is now directed to FIG. 41 which broadly illustrates the overall steps of a method of automated layup and compaction of composite plies. Beginning at 187, a supply of composite plies is loaded on a mobile vehicle and as previously discussed, the plies are placed in individual drawers corresponding to courses that are to be laid up on a tool 56. At 188, the vehicle is moved to the first of a plurality of indexed locations along the tool 56. At 190, the plies are robotically transferred from the vehicle to the tool where they are placed in preparation for compaction. At 200, the plies are robotically compacted against the tool following which, at 202 the vehicle is optionally returned to a source of plies where it is reloaded with plies, if required. Then at 203, the vehicle is moved to the next of the plurality of indexed placement locations along the tool 56. This process is repeated until lamination and compaction is complete.

Figure 42:
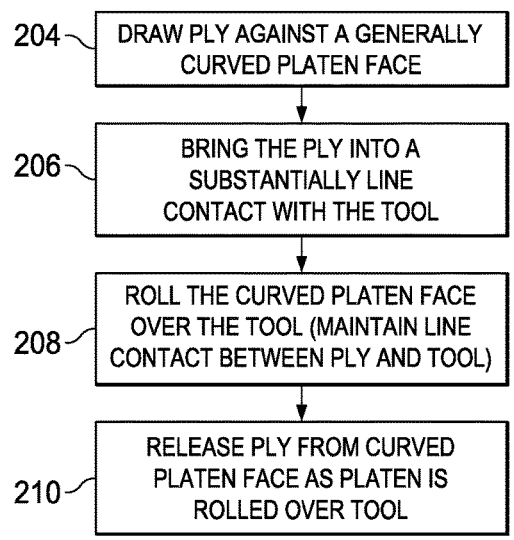
FIG. 42 is an illustration of a flow diagram of a method of placing a ply on a tool surface.

FIG. 42 illustrates the overall steps of a method of picking up and placing one or more composite plies 86. Beginning at 204, a ply is drawn against a generally curved platen face, as by using a suction force or by other means. At 206 the ply is brought into a substantially line contact with a tool. At 208, the curved platen face is rolled over the tool 56 while maintaining line contact between the ply and the tool. At 210, the plies released from the curved platen face as the platen rolls over the tool.

Figure 43:
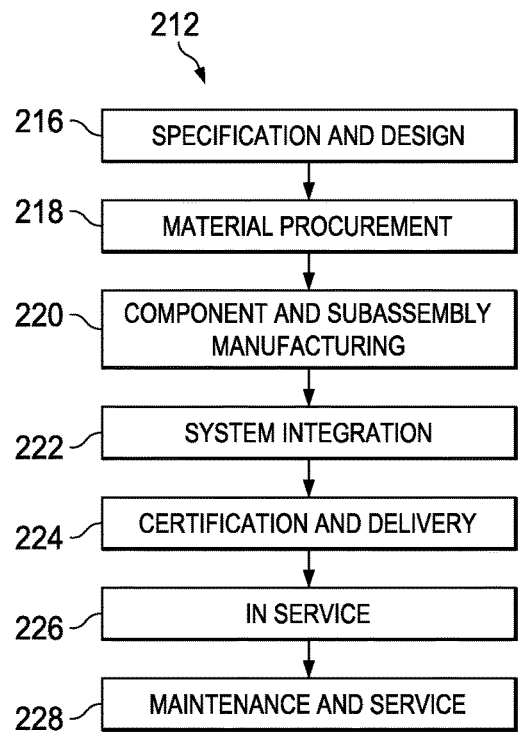
FIG. 43 is an illustration of a flow diagram of aircraft production and service methodology.
Figure 44:
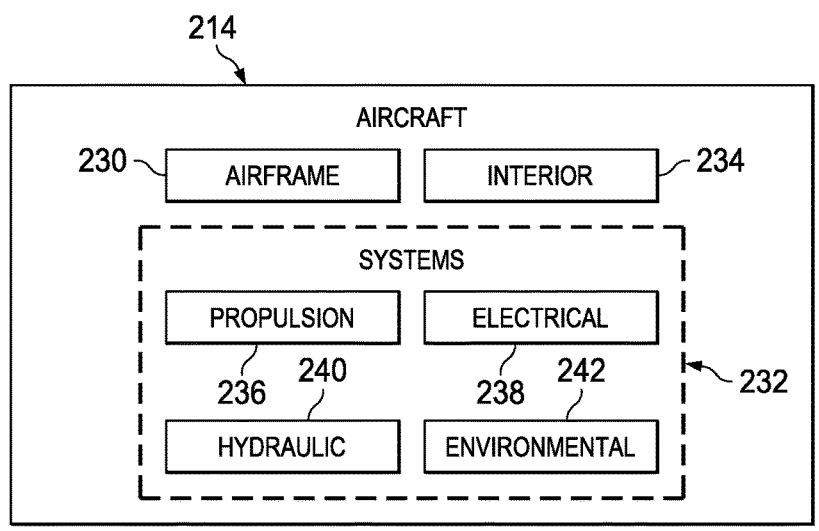
FIG. 44 is an illustration of a block diagram of an aircraft.

Embodiments of the disclosure may find use in a variety of potential applications, particularly in the transportation industry, including for example, aerospace, marine, automotive applications and other application where elongate composite members, such as stringers, may be used. Thus, referring now to FIGS. 43 and 44, embodiments of the disclosure may be used in the context of an aircraft manufacturing and service method 212 as shown in FIG. 43 and an aircraft 214 as shown in FIG. 44. Aircraft applications of the disclosed embodiments may include, for example, without limitation, stringers, spars, beams and other stiffeners. During pre-production, exemplary method 212 may include specification and design 216 of the aircraft 214 and material procurement 218. During production, component and subassembly manufacturing 220 and system integration 222 of the aircraft 214 takes place. Thereafter, the aircraft 214 may go through certification and delivery to 224 in order to be placed in service during 226. While in service by a customer, the aircraft 214 is scheduled for routine maintenance and service 228, which may also include modification, reconfiguration, refurbishment, and so on.

Each of the processes of method 212 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 44, the aircraft 214 produced by exemplary method 212 may include an airframe 230 with a plurality of systems 232 and an interior 234. Examples of high-level systems 232 include one or more of a propulsion system 236, an electrical system 238, a hydraulic system 240 and an environmental system 242. Any number of other systems may be included. Although an aerospace example is shown, the principles of the disclosure may be applied to other industries, such as the marine and automotive industries.

Systems and methods embodied herein may be employed during any one or more of the stages of the production and service method 212. For example, components or subassemblies corresponding to production process 220 and 222 may be fabricated or manufactured in a manner similar to components or subassemblies produced while the aircraft 214 is in service. Also, one or more apparatus embodiments, method embodiments, or a combination thereof may be utilized during the production stages 220 and 222, for example, by substantially expediting assembly of or reducing the cost of an aircraft 214. Similarly, one or more of apparatus embodiments, method embodiments, or a combination thereof may be utilized while the aircraft 214 is in service, for example and without limitation, to maintenance and service 228.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Apparatus for laying up and compacting composite plies on a tool, comprising:
   a mobile vehicle;
   a ply supply on the vehicle, the ply supply including a plurality of composite plies;
   a platen on the vehicle for picking up and transferring the plies from the ply supply to the tool; and
   a compactor on the vehicle for compacting the plies on the tool.

2. The apparatus of claim 1, further comprising:
   a guidance and drive system for guiding and driving the vehicle alongside the tool.

3. The apparatus of claim 1, further comprising:
   a tool indexer coupling the vehicle with the tool at preselected, indexed locations along the tool.

4. The apparatus of claim 1, wherein the ply supply includes:
   a case, and
   a plurality of drawers in the case, each of the drawers capable of holding at least one of the plies.

5. The apparatus of claim 4, wherein the case is removably mounted on the vehicle.

6. The apparatus of claim 1, at least one robot on the vehicle for manipulating each of the platen and the compactor.

7. The apparatus of claim 6, further comprising:
   at least one inspection device on the vehicle capable of being manipulated by the robot for inspecting at least one feature of plies on the tool.

8. The apparatus of claim 7, wherein each of the platen, the compactor and the inspection device includes a releasable coupling and is capable of being releasably coupled with the robot.

9. Apparatus for laying up and compacting composite plies on an elongate tool, comprising:
   a mobile vehicle movable along a length of the tool;
   end effectors on the vehicle for placing and compacting plies on the tool; and
   a manipulator on the vehicle for manipulating the end effectors.

10. The apparatus of claim 9, wherein the end effectors include a platen for picking up and placing plies on the tool, and a compactor for compacting plies on the tool.

11. The apparatus of claim 10, wherein the end effectors include at least one inspection device for inspecting at least one feature of plies on the tool.

12. The apparatus of claim 9, further comprising:
   a plurality of movable drawers on the vehicle, each of the drawers be capable of holding at least one of the plies.

13. The apparatus of claim 10, wherein the platen includes:
   a generally curved ply engaging face, and
   a vacuum pickup system for holding plies on the face.

14. The apparatus of claim 13, wherein:
   the ply engaging face is compliant, and
   the vacuum pickup system includes a plurality of perforations in the ply engaging face through which air may be drawn forming a vacuum drawing a ply against the ply engaging face.

15. A method of laying up and compacting plies on a tool, comprising:
   loading a supply of composite plies on a mobile vehicle;
   moving the vehicle to each of a plurality of locations along the tool;
   robotically transferring plies from the vehicle to the tool; and
   robotically compacting the plies on the tool.

16. The method of claim 15, wherein loading a supply of composite plies includes placing at least one ply in each of a plurality of drawers on the vehicle.

17. The method of claim 16, further comprising:
   moving the vehicle between a ply source location and each of a plurality of locations along the tool where the plies are robotically transferred and compacted on the tool, and
   wherein placing plies of each of the plurality of drawers is performed at the ply source location.

18. The method of claim 15, wherein:
   robotically transferring the plies includes coupling a robot with a transfer platen and using the transfer platen to pick up and transfer the plies from the vehicle to the tool, and
   robotically compacting the plies includes coupling the robot with a compactor and using the compactor to compact the plies on the tool.

19. The method of claim 18, further comprising:
   coupling the robot with at least one inspection device, and
   inspecting at least one feature of a ply on the tool using the inspection device.

20. The method of claim 15, wherein robotically transferring the plies and robotically compacting the plies is performed at each of the plurality of locations along the tool.

21. A method of placing a composite ply on a tool, comprising:
   drawing the ply against a generally curved platen face;
   bringing the ply into a substantially line contact with the tool;
   rolling the curved platen face to pivot around a corner of the tool; and
   releasing the ply from the curved platen face as the curved platen face rolls over the tool so that the ply is wrapped around and onto the tool corner.

* * * * *